US010706490B2

(12) United States Patent
Calhoon

(10) Patent No.: US 10,706,490 B2
(45) Date of Patent: **\*Jul. 7, 2020**

(54) DIGITAL WATERMARKING APPLICATIONS

(71) Applicant: Digimarc Corporation, Beaverton, OR (US)

(72) Inventor: Sean Calhoon, Lake Oswego, OR (US)

(73) Assignee: Digimarc Corporation, Beaverton, OR (US)

( \* ) Notice: Subject to any disclaimer, the term of this patent is extended or adjusted under 35 U.S.C. 154(b) by 92 days.

This patent is subject to a terminal disclaimer.

(21) Appl. No.: 15/894,549

(22) Filed: Feb. 12, 2018

(65) Prior Publication Data

US 2018/0240212 A1 Aug. 23, 2018

Related U.S. Application Data

(62) Division of application No. 15/063,381, filed on Mar. 17, 2016, now Pat. No. 9,892,478.

(60) Provisional application No. 62/129,655, filed on Mar. 6, 2015.

(51) Int. Cl.
  *G06K 9/00* (2006.01)
  *G06T 1/00* (2006.01)
  *G06Q 20/20* (2012.01)

(52) U.S. Cl.
  CPC ......... *G06T 1/0092* (2013.01); *G06Q 20/208* (2013.01); *G06T 1/005* (2013.01); *G06T 1/0028* (2013.01); *G06T 2201/005* (2013.01)

(58) Field of Classification Search
  CPC ..... G06Q 20/208; G06T 1/0028; G06T 1/005; G06T 1/0092; G06T 2201/005
  See application file for complete search history.

(56) References Cited

U.S. PATENT DOCUMENTS

| | | |
|---|---|---|
| 5,862,260 A | 1/1999 | Rhoads |
| 6,590,996 B1 | 7/2003 | Reed |
| 6,614,914 B1 | 9/2003 | Rhoads |
| 6,625,297 B1 | 9/2003 | Bradley |
| 6,993,152 B2 | 1/2006 | Patterson |
| 7,072,490 B2 | 7/2006 | Stach |
| 7,340,076 B2 | 3/2008 | Stach |
| 7,352,878 B2 | 4/2008 | Reed |

(Continued)

OTHER PUBLICATIONS

2D Matrix Code Label Verification System, Istech, Wayback Machine archive dated Mar. 5, 2015.

(Continued)

*Primary Examiner* — Ian L Lemieux
(74) *Attorney, Agent, or Firm* — Digimarc Corporation

(57) ABSTRACT

In one aspect, assembly of multi-part food packaging is checked by reference to payloads of steganographically-encoded digital watermarks printed across the packaging components. Marking all surfaces of the packaging components allows arbitrary orientation of feed stock in assembly equipment, and wide latitude in placement of inspection cameras along the packaging line. In another aspect, a scanner at a retail checkout station is alert to any gap detected in steganographic encoding on retail product packaging and, if found, alerts an operator to possible presence of an adhesive label with a misleading barcode. A great variety of others features and arrangements are also detailed.

9 Claims, 26 Drawing Sheets

(56) References Cited

U.S. PATENT DOCUMENTS

| | | |
|---|---|---|
| 7,831,062 B2 | 11/2010 | Stach |
| 9,690,967 B1 * | 6/2017 | Brundage ............ G06T 1/0021 |
| 2003/0057276 A1 | 3/2003 | Appalucci |
| 2003/0147549 A1 | 8/2003 | Choi |
| 2004/0223663 A1 | 11/2004 | Cato |
| 2005/0125337 A1 | 6/2005 | Tidwell |
| 2005/0274807 A1 | 12/2005 | Barrus |
| 2006/0165311 A1 | 7/2006 | Watson |
| 2006/0237534 A1 | 10/2006 | Junger |
| 2008/0002882 A1 | 1/2008 | Voloshynovskyy |
| 2008/0046368 A1 | 2/2008 | Tidwell |
| 2008/0112590 A1 | 5/2008 | Stach |
| 2008/0296382 A1 | 12/2008 | Connell |
| 2009/0060259 A1 | 3/2009 | Goncalves |
| 2009/0272801 A1 | 11/2009 | Connell, II |
| 2010/0049594 A1 | 2/2010 | Bonner |
| 2010/0150434 A1 | 6/2010 | Reed |
| 2010/0155463 A1 | 6/2010 | Roquemore, III |
| 2010/0217678 A1 | 8/2010 | Goncalves |
| 2011/0161086 A1 | 6/2011 | Rodriguez |
| 2012/0078989 A1 | 3/2012 | Sharma |
| 2013/0001290 A1 | 1/2013 | Trajkovic |
| 2013/0085829 A1 | 4/2013 | Kavis |
| 2013/0223673 A1 | 8/2013 | Davis |
| 2013/0230239 A1 | 9/2013 | Feris |
| 2013/0329006 A1 | 12/2013 | Boles |
| 2014/0052555 A1 | 2/2014 | MacIntosh |
| 2014/0095285 A1 | 4/2014 | Wadell |
| 2014/0164111 A1 | 6/2014 | Rodriguez |
| 2015/0016664 A1 | 1/2015 | Rodriguez |
| 2015/0016712 A1 | 1/2015 | Rhoads |
| 2015/0156369 A1 | 6/2015 | Reed |
| 2015/0187039 A1 | 7/2015 | Reed |
| 2015/0193780 A1 | 7/2015 | Migdal |
| 2015/0199581 A1 | 7/2015 | Zhang |
| 2016/0005029 A1 | 1/2016 | Ivey |
| 2016/0187199 A1 | 6/2016 | Brunk |
| 2016/0217547 A1 | 7/2016 | Stach |

OTHER PUBLICATIONS

Combining Creativity with Precision, Modern Packaging & Design, Sep.-Oct. 2012.

How to Guide—conducting Effective Label Checks, Woolworths Limited, Apr. 23, 2015.

How to Prevent Costly Mislabeling and Recalls with QuickLabel Digital Label printing, Jul. 2011.

Packaging Solutions brochure, Microscan, Jun. 2014.

Robinson, et al, Automated Inspection, Marcel Dekker, Inc., 1989 (excerpts).

Vision Inspection Supports Food Safety—Risks of Misinforming Product Content, Mettler Toledo, 2012.

Vision System Checks for Defective Wine Labels, vision-systems dot com, 2007.

* cited by examiner

| LABEL ID | COMPATIBLE LABEL IDS |
|---|---|
| E1A668 | 048459, 901921 |
| 048459 | E1A668, 901921 |
| 901921 | 8D15DE, BAAD54, 94FFF2, B07DC1, F1BE14, E1A668, 048459 |
| F22F7F | 7B6182, 6BA053, 004021 |
⋮
FIG. 3
FIG. 4
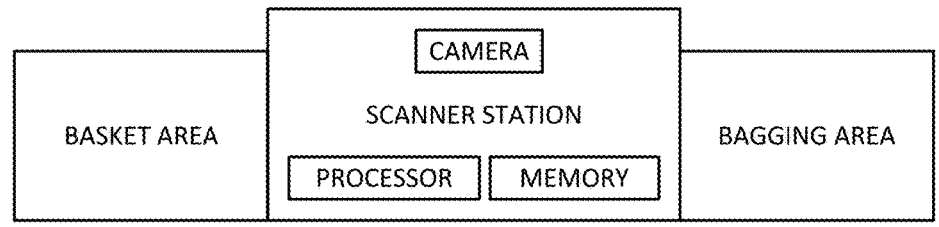
FIG. 5

| Sync Element Value | Cumulative % |
|---|---|
| 0-92 | nil |
| 93 | 0.2% |
| 94 | 0.3% |
| 95 | 0.4% |
| 96 | 0.6% |
| 97 | 0.7% |
| 98 | 0.8% |
| 99 | 1.0% |
| 100 | 1.2% |
| 101 | 1.5% |
| 102 | 1.8% |
| 103 | 2.3% |
| 104 | 2.7% |
| 105 | 3.2% |
| 106 | 3.9% |
| 107 | 4.6% |
| 108 | 5.4% |
| 109 | 6.4% |
| 110 | 7.5% |
| 111 | 8.9% |
| 112 | 10.3% |
| 113 | 11.8% |
| 114 | 13.7% |
| 115 | 15.3% |
| 116 | 17.3% |
| 117 | 19.8% |
| 118 | 21.9% |
| 119 | 24.4% |
| 120 | 27.1% |
| 121 | 29.5% |
| 122 | 32.4% |
| 123 | 35.3% |
| 124 | 38.3% |
| 125 | 41.5% |
| 126 | 44.8% |
| 127 | 48.1% |
| 128 | 51.5% |
| 129 | 54.4% |
| ... | ... |

FIG. 24A

| Sync Element Value | Cumulative % |
|---|---|
| 0-11 | nil |
| 12 | 0.21% |
| 13 | 0.27% |
| 14 | 0.31% |
| 15 | 0.34% |
| 16 | 0.38% |
| 17 | 0.40% |
| 18 | 0.45% |
| 19 | 0.53% |
| 20 | 0.58% |
| 21 | 0.61% |
| 22 | 0.63% |
| 23 | 0.68% |
| 24 | 0.79% |
| 25 | 0.87% |
| 26 | 0.93% |
| 27 | 0.99% |
| 28 | 1.12% |
| 29 | 1.21% |
| 30 | 1.29% |
| 31 | 1.49% |
| 32 | 1.59% |
| 33 | 1.70% |
| 34 | 1.82% |
| 35 | 1.93% |
| 36 | 2.03% |
| 37 | 2.17% |
| 38 | 2.27% |
| 39 | 2.39% |
| 40 | 2.54% |
| 41 | 2.65% |
| 42 | 2.83% |
| 43 | 3.00% |
| 44 | 3.18% |
| 45 | 3.34% |
| 46 | 3.52% |
| 47 | 3.78% |
| 48 | 4.00% |
| 49 | 4.18% |
| 50 | 4.41% |
| 51 | 4.56% |
| 52 | 4.75% |
| 53 | 4.94% |
| 54 | 5.18% |
| 55 | 5.38% |
| 56 | 5.58% |
| 57 | 5.83% |
| 58 | 6.10% |
| 59 | 6.28% |
| 60 | 6.59% |
| 61 | 6.97% |
| 62 | 7.27% |
| 63 | 7.68% |
| 64 | 8.04% |
| 65 | 8.33% |
| 66 | 8.69% |
| 67 | 9.09% |
| 68 | 9.51% |
| 69 | 9.86% |
| 70 | 10.38% |

FIG. 24B

DIGITAL WATERMARKING APPLICATIONS

RELATED APPLICATION DATA

This application is a divisional of application Ser. No. 15/063,381, filed Mar. 7, 2016 (now U.S. Pat. No. 9,892,478) which claims priority to provisional application 62/129,655, filed Mar. 6, 2015, the disclosure of which is incorporated by reference.

INTRODUCTION

Digital watermarking is an information hiding technology useful, e.g., in steganographically encoding printed items to convey plural symbol payloads. For example, artwork printed on the packaging of a retail product can be digitally watermarked with a payload that includes the product's GTIN (Global Trade Identification Number) identifier. Known digital watermarking methods include those detailed in U.S. Pat. Nos. 6,590,996, and 8,199,969, in published application 20140052555, and in patent application Ser. No. 14/616,686, filed Feb. 7, 2015 (now U.S. Pat. No. 9,380,186), and 62/106,685, filed Jan. 22, 2015.

In accordance with one aspect of the present technology, digital watermarking is employed to ensure that items that are to be combined with each other are properly-matched. A particular example is food containers, and their lids.

In accordance with another aspect of the present technology, digital watermarking is employed to reduce a growing type of retail fraud—barcode switching.

The foregoing and additional features and advantages of the present technology will be more readily apparent from the following Detailed Description, which proceeds with reference to the accompanying drawings.

BRIEF DESCRIPTION OF THE DRAWINGS

FIG. 3 shows a bottle of catsup employing three distinct labels.

FIG. 4 illustrates a data structure used in certain embodiments of the technology.

FIG. 5 is a block diagram showing an environment in which certain embodiments of the technology can be employed.

FIGS. 24A and 24B tabulate percentages of sync signal elements that have values below different thresholds, for two different embodiments.

DETAILED DESCRIPTION

Food is commonly packaged on automated manufacturing lines, which may fill and cap hundreds or thousands of containers per hour. An example is fresh salsa. A conveyor arrangement successively presents paper or plastic tubs under a filling nozzle, which dispenses a set amount (e.g., 16 oz.) of salsa from a reservoir. At a later station, a flat lid is press-applied. Further down the line the capped container passes by an inkjet printing mechanism that spray-paints an expiration date and lot code onto each container or lid. After such printing, the container passes into a bundler that secures the lid by applying and heat-shrinking a ring of security tape.

Similar arrangements are employed with yogurt, ice cream, sour cream, dips (e.g., bean dip, onion dip), and many jarred foods including baby food, etc.

Some consumers have food allergies or other sensitivities, making it essential that foodstuffs be labeled properly. Yet in the busy-ness of a manufacturing plant, and given human imperfection, it sometimes happens that wrong lids are applied. For example, a lid may indicate that it caps a gluten-free variant of a producer's bean dip, yet be applied mistakenly to a container of bean dip marked as including gluten. Likewise, a lid indicating "Chocolate Ice Cream" may be applied to a tub labeled and containing chocolate peanut ice cream. In addition to gluten and peanuts, such issues similarly arise with casein, dairy, high fructose corn syrup, and GMO marking, etc.

To address this problem, one aspect of the present technology employs digital watermarks encoded in artwork formed on food lids and containers. Each such watermark conveys a payload including, e.g., the GTIN for the product with which the packaging is to be used. For example, a producer's chocolate ice cream product may have the GTIN 0087932602588. This number is included in the payload of a digital watermark encoded in the artwork for the ice cream container, and this same number is included in the payload of a digital watermark encoded in the (different) artwork for the ice cream lid.

On the manufacturing line, a first camera inspects each tub just before it is filled, and a second camera inspects each lid just before it is applied. A software-programmed processor decodes the digital watermark payload from each image, and ensures they match. (A further check can be made to ensure that the GTINs encoded in the tub artwork and lid artwork properly match an identifier for the foodstuff being dispensed into the container.) If a mismatch is detected, an alarm is sounded, and the packaging line is halted. Plant personnel can then investigate the mismatch, and correct the material flow as appropriate (e.g., replacing wrong lids with correct lids in the lid hopper).

Figure 1:
FIGS. 1 and 2 show food packaging in which a labeled lid is applied to a labeled food container.

In one particular embodiment, the containers are generally cylindrical (i.e., they are rotationally-symmetric about a central axis) and the lids are round, as shown in FIG. 1). This has an advantage in that, regardless of the camera's mounting position in the packaging line, the face of the container closest to the camera will present a strip of watermarked artwork that is generally squarely-facing the camera, enabling the watermark to often be decoded without geometrically altering the image to correct for viewpoint distortion.

Figure 2:

In another particular embodiment, the containers are generally rectangular, as are the lids, as shown in FIG. 2. This has a different advantage: a surface expanse of the container extends in a single plane, so that depiction of the surface in the captured imagery has a generally uniform (sometimes affine) distortion. Compensation of such distortion is straightforward by reference to spatial frequency-domain markers within the digital watermark signal, providing a relatively large area of distortion-corrected artwork from which the digital watermark payload can be decoded.

In another embodiment, rather than sense watermarked information from the components before they are combined, the checking is done after combination. In the salsa example, one or more cameras captures imagery depicting both the top and side of a finished foodstuff container to check, e.g., that the watermark payload encoded in the lid artwork matches the watermark payload encoded in the container artwork.

Sometimes an extension string of several symbols is appended to the product's GTIN identifier to distinguish product or label variants. Alternatively a code distinct from the GTIN can be employed. Some producers have proprietary codes that can be used for such purpose, such as the IRMS (Individual Raw Material Specification) numbers (also called the GCAS or PCEM codes) issued by Proctor and Gamble.

The present technology is also useful in checking that multiple adhesive labels applied to a common product are combined appropriately.

Consider a bottle of catsup, or a jug of laundry detergent, that bears several labels, e.g., one label for a front surface of the container, a second label for a back surface, and a third label on the neck. (A barcode encoding the product's GTIN may appear on only one of the labels—typically the second.) FIG. 3 is exemplary, and shows a front label 41 and a neck label 42 on a bottle of catsup. (The back label is not depicted.)

Again, it is important that such labels be used in consistent groupings. Each different label (including each label revision) can be assigned a distinct identifier, and printing on the label can convey such identifier. Small Data Matrix barcodes have been used for such a purpose in the past, but are visually distracting, and occupy real estate that the producer would prefer to apply to communications with the consumer.

In accordance with an example of the present technology, artwork for each label steganographically encodes a corresponding identifier for that label. The encoding can convey both the identifier for that label, and the GTIN for the product. These two data can be combined into a single payload, and represented by a single watermark pattern included in the label artwork. Alternatively, the two data can be conveyed in separate watermark patterns—both of which are included in the label artwork.

A reference data structure can establish permitted combinations of labels on a product. For example, such a data structure can detail a label's identifier, together with identifiers of all other labels with which it properly may be combined. To illustrate, the neck label 42 in FIG. 4 (which includes text "GREAT TOMATO TASTE") can be used on all varieties of bottled catsup, but the front label 41 (which touts, e.g., no salt, and no high fructose corn syrup) is suitable for use on a much smaller range of products.

FIG. 4 illustrates a table stored in memory, which may serve as such a data structure.

In a product packaging line, cameras capture imagery of the plural labels applied to a product, e.g., labels A, B and C. An associated computer system then checks label A against the data structure to confirm that its combination with label B is permissible. In particular, it searches the first column of the illustrated table for an instance of the label A identifier. If found, it then searches the text in the adjoining cell in the second column to locate the label B identifier. If the label B identifier is not found, the system declares an error and takes a corresponding action (e.g., issuing an alert to an operator, halting the manufacturing line, etc.)

The system similarly checks to validate label A's combination with label C Likewise, label B is checked for use with C. (Further checks are theoretically redundant, but can be useful in revealing inconsistencies in the data structure, e.g., checking label B for use with label A, and checking label C for use with labels A and B.)

The table data structure of FIG. 4 is simple and suitable in some applications. In other applications, however, more sophisticated structures are used. For example, a database may store business rules defining permitted uses for each label—and associated exceptions. The rules for neck label 41 may indicate its general applicability on essentially all bottles of catsup, but may further specify that such label not be applied on the second Thursday of each month—when the manufacturing line is to turn out pallets of catsup destined for a big box retailer who has specified that no neck labels are to be present in its inventory.

Another application of such technology is in assuring that the latest version of artwork is applied. Product packaging is commonly revised, e.g., to comply with new labelling laws, to adopt updated product artwork, etc. Again the problem of mis-matching arises.

An exemplary situation is ingredient substitution. For instance, a producer may alter a food product's composition by changing an artificial coloring agent from FD&C Blue No. 1 to FD&C Blue No. 2. The product's GTIN may be unchanged. Yet the producer needs to ensure that labels bearing updated artwork—listing FD&C Blue No. 2—are applied to all product packaged after the changeover date.

When the producer generates new artwork for the revised product label, e.g., including FD&C Blue No. 2 in the printed list of ingredients, a new watermark payload is encoded in a steganographic digital watermark pattern. Inspection equipment on the manufacturing line is simultaneously programmed to change its conformance check to no longer look for the former label (identified by a former payload), but to instead look for the new label (identified by the new payload). As before, if the inspection system detects non-conforming labels, a corresponding action is taken (e.g., issuing an alert to an operator, halting the manufacturing line, etc.).

Here, as in other embodiments, the inspection can take place after the labels have been applied to the product. Alternatively, inspection can occur upstream, e.g., examining rolled label feedstock that is provided to multiple label applicator machines, before these machines apply labels to the product.

In exemplary embodiments, 64-bit payloads are encoded in the label artwork. Applicant has found this payload capacity is large enough to represent both a GTIN identifier and a revision code, but is short enough so that each bit can be robustly encoded, to ensure that each bit is reliably decoded. Smaller or larger payloads can naturally be used, depending on the particular application scenario.

Food containers are just one example of how such technology can be applied. More generally, whenever items are combined, the issue of compatibility arises. Consider precision mechanical components that are machined to fit each other within tight tolerances. A "lot" can define a group of such components. A first component from one "lot" may not fit as well with a second component from a second "lot," due to changes in the machinery on which the components were manufactured, differences in thermal properties of materials, etc. So another use of the present technology is in identifying the "lot" to which different components belong, so they can be used in conjunction with components from the same, or a known-compatible, lot.

Related to lot coding is date coding. It may be desirable that items used together have certain commonalities in date parameters, e.g., checking that each is within a permitted date range, or checking that the items' date parameters differ by less than a threshold amount.

Another application is compatible material composition. In mechanical assemblies, for example, it is desirable that each of the metal components be comprised of the same alloy, to assure similar wear and thermal properties. A simple example: using a stainless steel bolt with a galvanized steel nut is undesirable. Again, such information can be encoded on the components (e.g., by texturing) and checked to ensure that paired components are properly matched, either before or after pairing.

Another aspect of the present technology concerns deterring retail fraud.

It has been reported that some criminals conspire to defraud merchants by applying adhesive barcode labels that mis-identify products, permitting the products to be purchased at self-checkout stations for less than their true value. The products thus-purchased can then be resold on online auction sites, or on the black market.

A simple example is a barcode label encoding the GTIN of a $10 dollar bottle of wine, which is applied to a $50 bottle of wine in a supermarket. A conspirator (who may be the person who applied the fraudulent labels, or an accomplice who arrives later) purchases three such bottles for $30, and leaves the store with $150 in merchandise.

Audacious criminals may try the ruse even at checkout stands staffed by store personnel (e.g., at busy big box retailers). The merchandise there can be much more expensive than at groceries. For example, a box containing a high end Hoover Wind Tunnel vacuum cleaner, which retails for $250, may be marked with a barcode identifying it as a low end model in the same product line, retailing for $79. If the staff is busy enough, they might not notice—or give a thought—to an adhesively-applied barcode.

In accordance with this aspect of the technology, a checkout system is equipped with one or more cameras that capture imagery from products presented for checkout, to decode a steganographic watermark conveying a GTIN identifier. The captured image data can likewise be analyzed to detect the presence of a barcode (1D or 2D), and decode its payload. If a GTIN is decoded from both a product watermark and a product barcode, the values are compared. If there is a mismatch, a signal is issued to store staff, alerting them to the possible presence of a fraudulent barcode label adhered to the packaging.

A variant embodiment detects such tampering by a telltale void in the watermark signal detected from product packaging.

Watermark encoding typically spans the full-extent of retail product packaging. In the rare cases where a region of the artwork is un-watermarked (or the watermark cannot be decoded), such region is usually irregularly shaped. (One example is where a cardboard carton has been accidentally scraped, and part of the printing has been torn-off.)

In accordance with this embodiment, imagery depicting the package is analyzed to identify any region on the product surface where a watermark is not detected. If such region is found, a further check is made to determine whether the region is rectangular in shape (e.g., bounded by orthogonal pairs of parallel edges). If so, this void in watermark signal is consistent with application of a rectangular barcode label over the packaging artwork. (Since such a label would not bear the same GTIN-encoded watermark as spans the rest of the packaging, it appears as an absence of the expected watermark signal.) Again, a signal is issued to store staff, to alert them to possible presence of a fraudulent barcode.

FIG. 5 shows a retail self-checkout station that includes a scanner station incorporating the just-described technology.

The following sections more particularly detail exemplary embodiments, e.g., for encoding identifiers on product packaging (e.g., labels and containers), and later decoding same (e.g., at a point of sale terminal or in a machine vision system that inspects operation of a manufacturing line).

Vision equipment employed in manufacturing line inspection systems typically includes an image capture system and an associated source of illumination. The image capture system is comprised of optical elements, such as a lens, mirror(s), 2D imager (e.g., CMOS camera), which together enable capture of views of an object from a (usually fixed) vantage point. This vantage point is often quite close to the subject being imaged, e.g., as close as an inch or so.

Such systems capture frames in range of around 10 to 90 frames per second. In some systems, processing of a frame must be completed prior to the arrival of the next frame. In such case, the system has from 10 to 100 ms to decode any code depicted in the captured frame.

Figure 6:
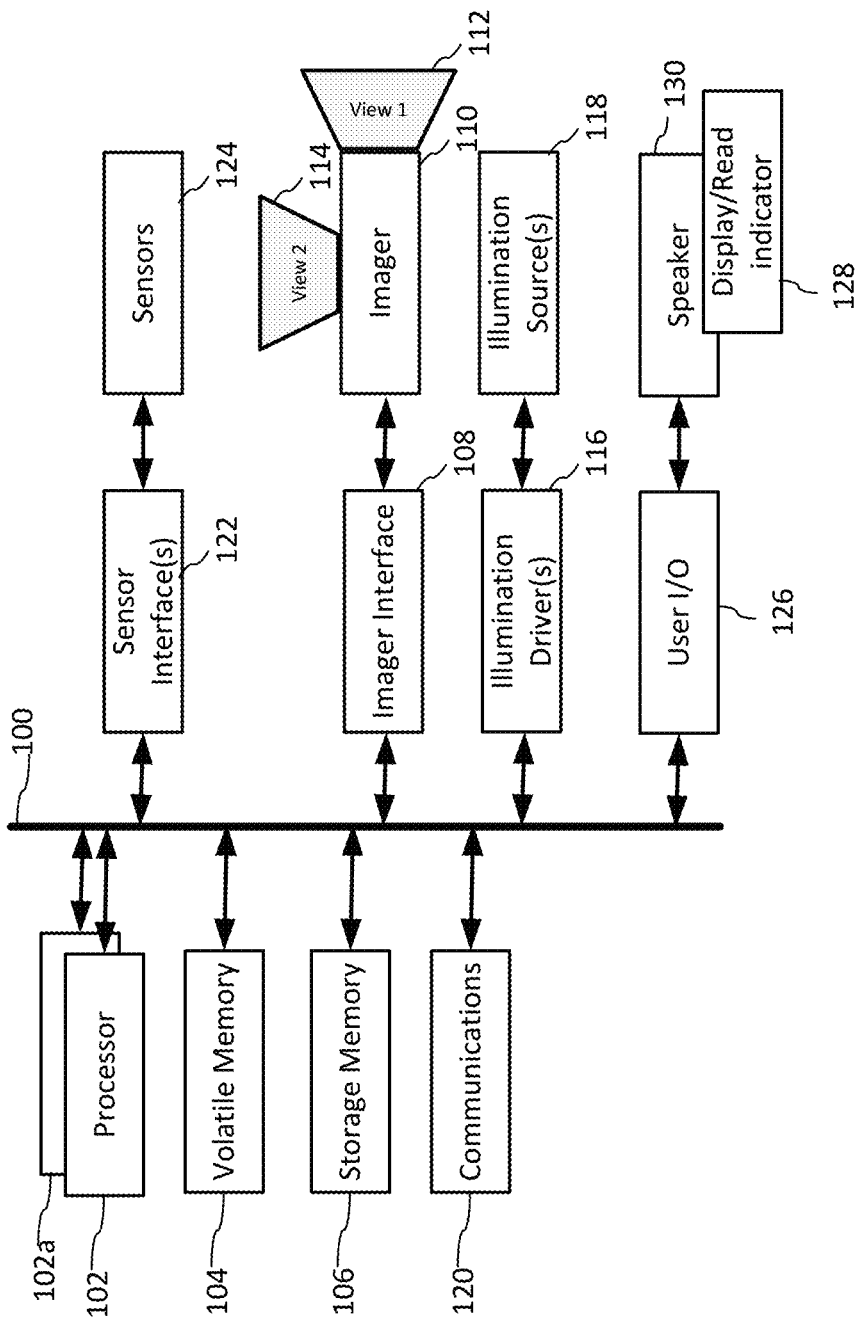
FIG. 6 is a diagram of components in an exemplary embodiment.

For the sake of illustration, FIG. 6 is a diagram of components in such a system.

Please also see the specification of assignee's application Ser. No. 14/842,575 (now U.S. Pat. No. 9,819,950), HARDWARE-ADAPTABLE WATERMARK SYSTEMS, which is hereby incorporated by reference. This specification describes hardware configurations for reading machine readable data encoded on objects, including configurations usable with vision systems for manufacturing line inspection.

Referring to FIG. 6, the system has a bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 facilitates both DMA transfers and direct processor read and write instructions. In one embodiment, the bus 100 is one of the Advanced Microcontroller Bus Architecture (AMBA) compliant data buses. Although FIG. 6 illustrates an embodiment in which all components are communicatively coupled to the bus 100, one or more components may be communicatively coupled to a separate bus, and may be communicatively coupled to two or more buses. Although not illustrated, the system can optionally include one or more bus controllers (e.g., a DMA controller, an I2C bus controller, or the like or combination thereof), through which data can be routed between certain of the components.

The system also includes at least one processor 102. Processor 102 may be a microprocessor, mobile application processor, etc., known in the art (e.g., a Reduced Instruction Set Computer (RISC) from ARM Limited, the Krait CPU product-family, X86-based microprocessor available from the Intel Corporation including those in the Pentium, Xeon, Itanium, Celeron, Atom, Core i-series product families, etc.). The processor may also be a Digital Signal Processor (DSP) such the C6000 DSP category from Texas Instruments. FIG. 6 shows a second processor behind processor 102 to illustrate that the system may have plural processors, as well as plural core processors. Other components on the bus 100 may also include processors, such as DSP or microcontroller.

Processor architectures used in current vision systems include, for example, ARM (which includes several architecture versions), Intel, and TI C6000 DSP. Processor speeds typically range from 400 MHz to 2+ Ghz. Some arrangements employ ARM NEON technology, which provides a Single Instruction, Multiple Data (SIMD) extension for a class of ARM processors.

The processor 102 runs an operating system, and runs application programs and, manages the various functions of the device. The processor 102 may include or be coupled to a read-only memory (ROM) (not shown), which stores an operating system (e.g., a "high-level" operating system, a "real-time" operating system, a mobile operating system, or the like or combination thereof) and other device firmware that runs on the system.

The system also includes a volatile memory 104 electrically coupled to bus 100 (also referred to as dynamic memory). The volatile memory 104 may include, for example, a type of random access memory (RAM). Although not shown, the system includes a memory controller that controls the flow of data to and from the volatile memory 104. Current systems typically have around 500 MiB of dynamic memory, and around 8 KiB of stack.

The depicted embodiment also includes a storage memory 106 connected to the bus. The storage memory 106 typically includes one or more non-volatile semiconductor memory devices such as ROM, EPROM and EEPROM, NOR or NAND flash memory, or the like or combinations thereof, and may also include alternative storage devices, such as, for example, magnetic or optical disks. The storage memory 106 is used to store one or more items of software. Software can include system software, application software, middleware, one or more computer files (e.g., one or more data files, configuration files, library files, archive files, etc.), one or more software components, or the like or stack or other combination thereof.

Examples of system software include operating systems (e.g., including one or more high-level operating systems, real-time operating systems, mobile operating systems, or the like or combination thereof), one or more kernels, one or more device drivers, firmware, one or more utility programs (e.g., that help to analyze, configure, optimize, maintain, etc., one or more components of the system), and the like. Suitable operating systems include but are not limited to Windows (multiple versions), Linux, iOS, Quadros, and Android.

Compilers used to convert higher level software instructions into executable code for these devices include: Microsoft C/C++, GNU, ARM, and Clang/LLVM. Examples of compilers used for ARM architectures are RVDS 4.1+, DS-5, CodeSourcery, and Greenhills Software.

Also connected to the bus 100 is an imager interface 108. The imager interface 108 connects one or more one or more imagers 110 to bus 100. The imager interface supplies control signals to the imagers to capture frames and communicate them to other components on the bus. In some implementations, the imager interface also includes an image processing DSP that provides image processing functions, such as sampling and preparation of groups of pixel regions from the 2D sensor array (blocks, scanlines, etc.) for further image processing. The DSP in the imager interface may also execute other image pre-processing, recognition or optical code reading instructions on these pixels. The imager interface 108 also includes memory buffers for transferring image and image processing results to other components on the bus 100.

Though one imager 110 is shown in FIG. 6, the system may have additional imagers. Each imager is comprised of a digital image sensor (e.g., CMOS or CCD) or like camera having a two-dimensional array of pixels. The sensor may be a monochrome or color sensor (e.g., one that employs a Bayer arrangement), and operate in a rolling and/or global shutter mode. Examples of these imagers include model EV76C560 CMOS sensor offered by e2v Technologies PLC, Essex, England, and model MT9V022 sensor offered by On Semiconductor of Phoenix, Ariz. Each imager 110 captures an image of its view or views of a view volume of the imager, as illuminated by an illumination source. The imager captures at least one view. Plural views (e.g., view1 112 and view2 114) are captured by a single imager in systems where optical elements, such as mirrors and beam splitters are used to direct light reflected from different sides of an object in the view volume to the imager.

Also coupled to the bus 100 is an illumination driver 116 that controls and illumination sources 118. Typical systems employ Light Emitting Diodes (LEDs) as illumination sources. In one typical configuration, red LEDs are paired with a monochrome camera. The illumination driver applies signals to the LEDs to turn them on in a controlled sequence (strobe them) in synchronization with capture by an imager or imagers. In another configuration, plural different color LEDs may also be used and strobed in a manner such that the imager(s) selectively capture images under illumination from different color LED or sets of LEDs. See, e.g., Patent Application Publication 2013-0329006, entitled COORDINATED ILLUMINATION AND IMAGE SIGNAL CAPTURE FOR ENHANCED SIGNAL DETECTION, and Ser. No. 14/836,878, entitled SENSOR-SYNCHRONIZED SPECTRALLY-STRUCTURED-LIGHT IMAGING (published as US20160187199) which are hereby incorporated by reference. The latter captures images in plural different spectral bands beyond standard RGB color planes, enabling extraction of encoded information as well as object recognition based on pixel samples in more narrow spectral bands at, above and below the visible spectrum.

In another configuration, a broadband illumination source is flashed and image pixels in different bands, e.g., RGB, are captured with a color image sensor (e.g., such as one with a Bayer arrangement). The illumination driver may also strobe different sets of LED that are arranged to illuminate particular views within the view volume (e.g., so as to capture images of different sides of an object in the view volume).

The illustrated system also includes at least one communications module 118, each comprised of circuitry to transmit and receive data through a wired or wireless link to another device or network. One example of a communication module is a connector that operates in conjunction with software or firmware in the system to function as a serial port (e.g., RS232), a Universal Serial Bus (USB) port, and an IR interface. Another example of a communication module is a universal interface driver application specific integrated circuit (UIDA) that supports plural different host interface protocols, such as RS-232C, IBM46XX, or Keyboard Wedge interface. The system may also have communication modules to support other communication modes, such as USB, Ethernet, Bluetooth, Wifi, infrared (e.g., IrDa) or RFID communication.

Also connected to the bus 100 is a sensor interface module 122 communicatively coupled to one or more sensors 124. Some configurations have data capture sensors such as RFID or NFC readers or the like for reading codes from products.

The sensor interface module 122 may also optionally include cache or other local memory device (e.g., volatile memory, non-volatile memory or a combination thereof), DMA channels, one or more input buffers, one or more output buffers to store and communicate control and data signals to and from the sensor.

Finally, the system may be equipped with a variety of user input/output devices, connected to the bus 100 via a corresponding user I/O interface 126. Examples include indicator lights or display 128 and/or speaker 130. The system may also have a display and display controller connecting the display device to the bus 100. For I/O capability, the system has a touch screen for both display and user input.

Figure 7:
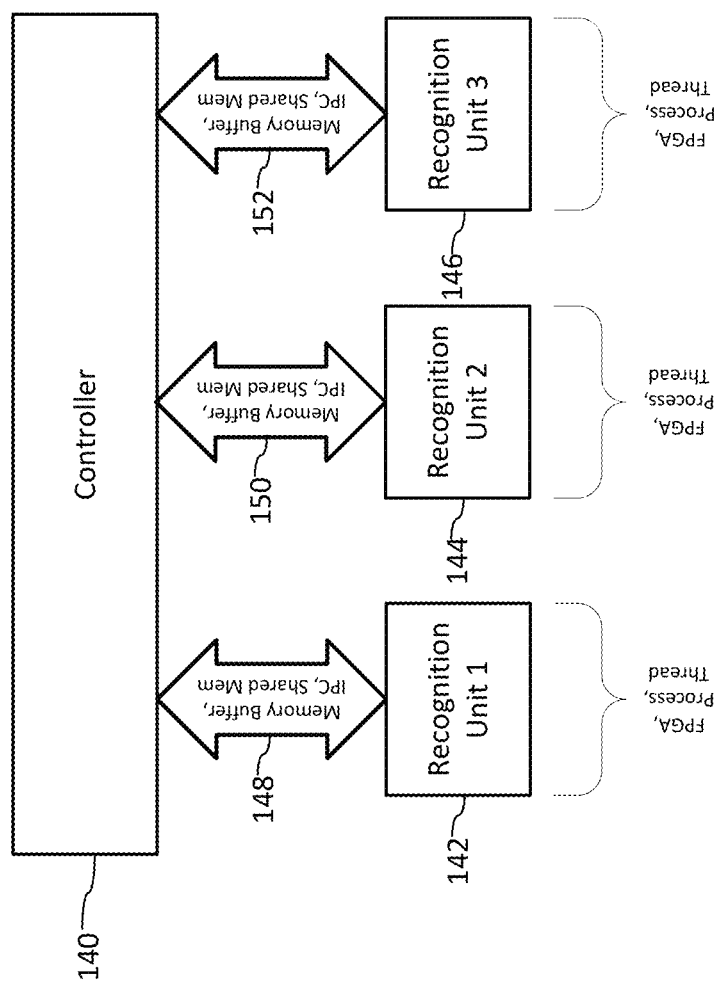
FIG. 7 is a diagram illustrating a processing architecture for controlling recognition units within an exemplary system.

FIG. 7 is a diagram illustrating a processing architecture for controlling visual recognition units within an inspection system. The processing architecture comprises a controller and recognition units. Each of these elements is a logical processing module implemented as a set of instructions executing on a processor in the system, or implemented in an array of digital logic gates, such as a Field Programmable Gate Array (FPGA) or Application Specific Integrated Circuit (ASIC). Each of the modules may operate within a single component (such as a processor, FPGA or ASIC), within cores of a plural core processor, or within two or more components that are interconnected via the bus 100 or other interconnect between components in the system hardware of FIG. 6. The implementer may create the instructions of each module in a higher level programming language, such as C/C++ and then port them to the particular hardware components in the architecture of choice.

In this example, we show a controller and three recognition units. There may be more or less of each in a given implementation. The controller 140 is responsible for sending recognition tasks to recognition units (142, 144 and 146), getting the results of those tasks, and then executing logic to determine the identifier to be sent to a central control computer. The controller module 140 communicates with the recognition units (142-146) via communication links 148, 150, 152. The manner in which the controller communicates with the recognition units depend on the implementation of each. To communicate with an FPGA, the controller communicates through a memory buffer, e.g., via the bus 100.

To communicate among software processes, the controller process employs inter-process communication (IPC). The particular form of IPC depends in part on the operating system executing in the scanner. For a Unix OS or Unix derivatives, IPC may be implemented with sockets.

Finally, controller and recognition units may be implemented within a single software process in which communication among software routines within the process is implemented with shared memory. Within a process, the software program of each recognition units may be executed serially and report its results back to the controller. Recognition units may also be executed as separate threads of execution. The operating system manages pre-emptive multi-tasking and multi-threading (if employed) for software processes and threads. The operating system also manages concurrent execution on processes on processors, in some implementations in which more than one processor is available for the controller, recognition units, and other image processing.

A recognition unit executes instructions on an image block provided to it to recognize an object or objects in the image block and return a corresponding recognition result. For optical codes like barcodes and digital watermark data carriers (sometimes referred to as "Digimarc Barcodes"), the recognition result comprises the digital payload extracted from the carrier, which may be formatted as a string of binary or M-ary symbols or converted to a higher level code such as a GTIN data structure in accordance with the GS1 specification for GTINs. Recognition units that perform optical code reading include, for example, optical code readers for 1-dimensional optical codes like UPC, EAN, Code 39, Code 128 (including GS1-128), stacked codes like DataBar stacked and PDF417, or 2-dimensional optical codes like a DataMatrix, QR code or MaxiCode.

Figure 8:
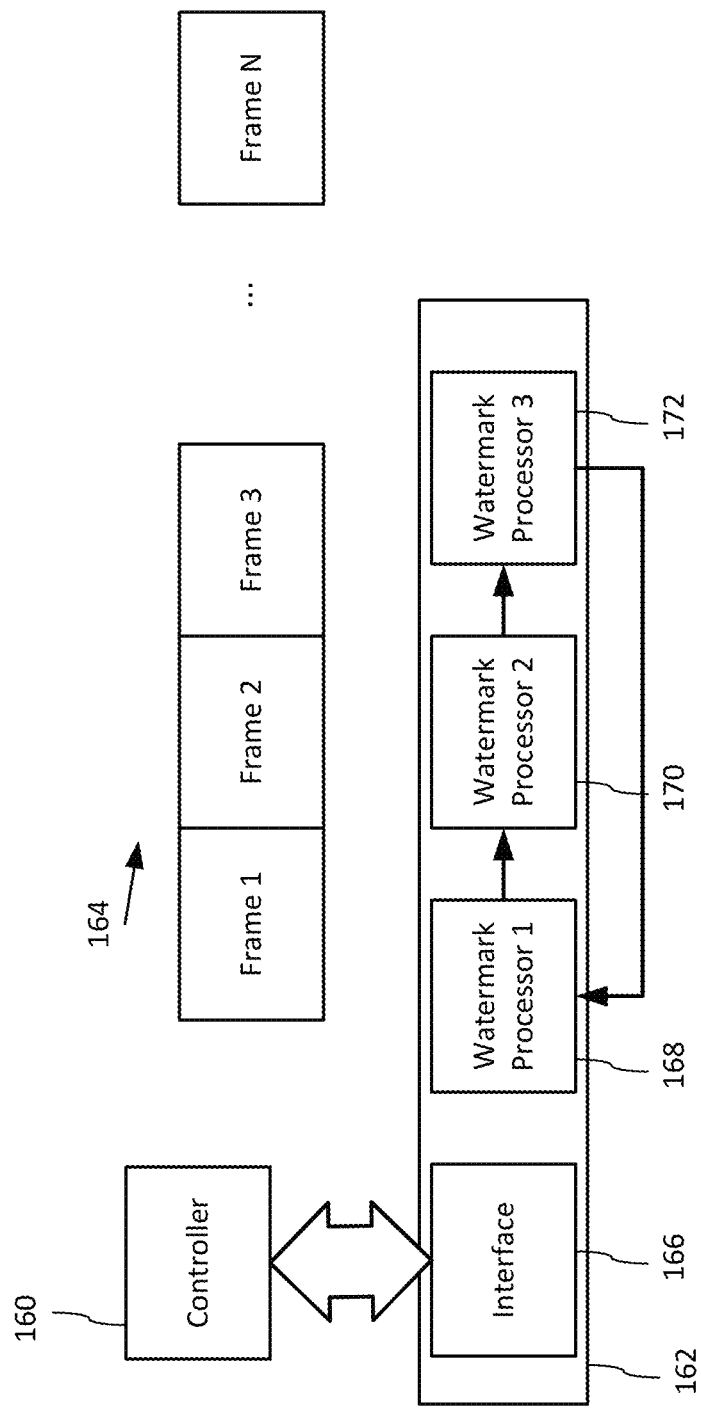
FIG. 8 is diagram illustrating software modules that operate on a sequence of image frames to detect and extract digital payloads from images of objects within the frames.

FIG. 8 is diagram illustrating software modules 160, 162 that operate on a sequence of image frames 164 to detect and extract digital payloads from images of objects within the frames. Controller 160 is an example of a controller 140 in the architecture of FIG. 7. This diagram illustrates the interaction of a controller with one particular implementation of a recognition unit 162. In this instance, the controller 160 and recognition unit are software processes. In one embodiment, they execute on distinct processors within the scanner. For example, they execute either in the separate processors 102, 102a, or the controller executes in processor 102 and recognition unit executes in a processor within the imager interface 108 (e.g., DSP). In another embodiment, they execute within the same processor, e.g., processor 102, or within a DSP in the imager interface 108.

In still another embodiment, the controller executes in processor 102, and the instructions of the recognition unit are implemented within an FPGA or ASIC, which is part of another component, such as the imager interface, or a separate component on bus 100.

The software process of the recognition unit 162 performs a form of recognition that employs digital watermark decoding to detect and extract watermark payloads from encoded data tiles in the image frames 164. The term "frame" refers to a group of pixels read from a 2D sensor array for a time period in which a 2D image is captured on the sensor array. Recall that the sensor may operate in rolling shutter or global shutter mode. In some implementations, selected rows of the sensor array are sampled during a capture period and stored in a memory buffer (e.g., in the imager interface), which is accessed by the recognition unit(s). In others, an entire frame of all pixels in the sensor array are sampled and stored in a frame buffer, which is then accessed by the recognition unit(s). The group of pixels sampled from a frame may include plural views of the viewing volume, or a part of the viewing volume.

The recognition unit 162 has the following sub-modules of instructions: interface 166 and watermark processors 168, 170, 172. The interface comprises software code for receiving calls from the controlling and returning recognition results from shared memory of the software process of the recognition unit 162. Watermark processors are instances of watermark decoders.

When a container moves into the field of view of the camera, controller 160 invokes the recognition unit 162 on image frames containing the object. Via interface 166, the controller 160 calls the recognition unit 162, providing the frames 164 by supplying an address of or pointer to them in the memory of the scanner (image buffer in e.g., either volatile memory 104 or memory buffers in imager interface 108). It also provides other attributes, such as attributes of the view from which the frame originated.

The recognition unit proceeds to invoke a watermark processor 168-172 on frames in serial fashion. Watermark processors 1-3 operate on frames 1-3, and then process flow returns back to watermark processor 1 for frame 4, and so on. This is just one example of process flow in a serial process flow implementation. Alternatively, watermark processors may be executed concurrently within a process as threads, or executed as separate software processes, each with an interface and watermark processor instance.

The recognition unit 162 provides the extracted payload results, if any, for each frame via communication link as described above. The controller analyzes the results from the recognition unit and other recognition units and determines when and what to report to the POS terminal. Each watermark processor records in shared memory of the recognition unit 162 its result for analyzing the image block assigned to it. This result is a no detect, a successful read result along with decoded payload, or payloads (in the event that plural watermark payloads are detected within a frame). Optionally the watermark processor provides orientation parameters of the decoded payload, which provide geometric orientation and/or position of the tile or tiles from which the payload is decoded.

Figure 9A:
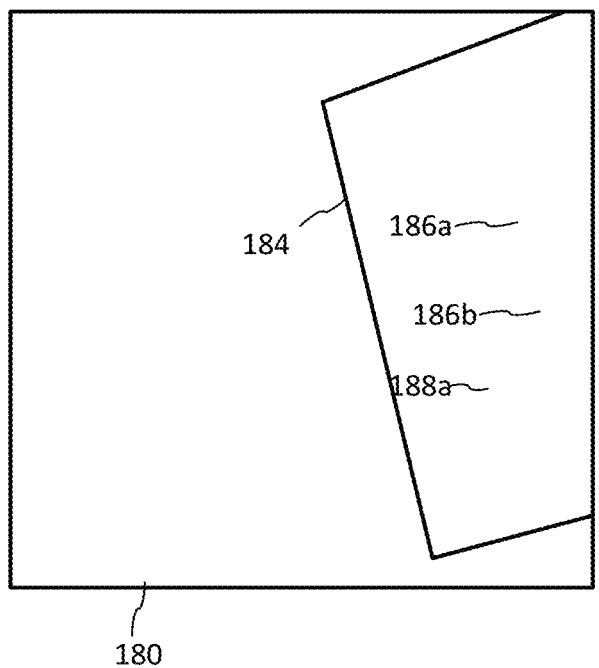
FIGS. 9A and 9B illustrate image portions of an object in different frames captured from a field of view of an imager.
Figure 9B:
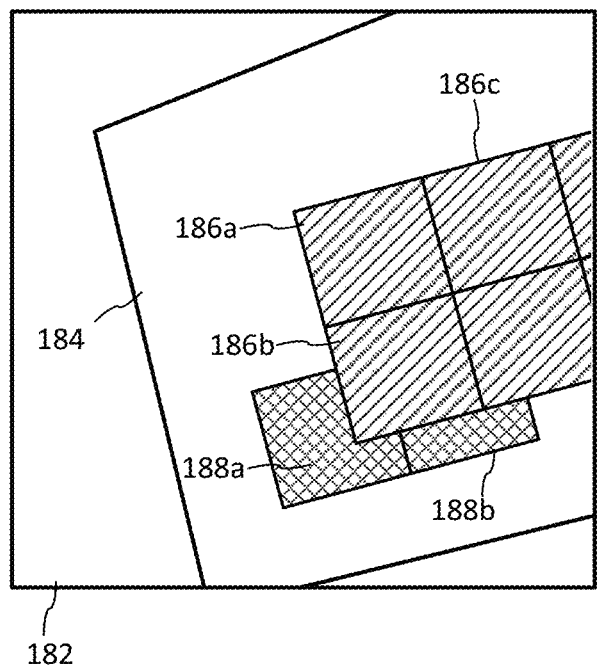

FIGS. 12A and 12B illustrate image portions 180, 182 in different frames captured from a field of view of an imager. An object 184 is moving through this field of view in these frames. Here, we use the phrase, "image portion," to reflect that the image portion of a frame is not necessarily co-extensive with the entire pixel array of an imager. As noted, an imager may capture plural views of the object 184 per frame, and the image portion may correspond to one particular view of plural different views captured by the image sensor array for a frame. Alternatively, it may encompass plural views imaged within a frame. Also, frames from different imagers may be composited, in which case, the image portion may include a portion of frames composited from different imagers. Nevertheless, FIG. 9A depicts an image block from a frame at a first capture time, and FIG. 9B represents an image block from a second, later capture time.

For sake of illustration, we use an example where the imager has a frame capture rate of 100 frames per second. Thus, a new frame is available for sampling as fast as every 10 ms. The rate at which the controller provides frames or portions of frames to each recognition unit may not be as high as the frame rate. Thus, the frames illustrated here need not be strictly adjacent in a video sequence from the sensor, but are within a time period in which an object 184 moves through the field of view of the scanner. The object movement may be from a conveyor or other material handling equipment that moves a container through a field of view of the imager. Image portion 180 at frame time, T1, includes an image captured of at least a first part of object 184. This object has encoded data tiles having a first payload 186a, 186b, and encoded data tile 188a having a second payload. Image block 182, at a later frame time, T2, depicts that the object 184 has moved further within the field of view of the scanner. At T2, more tiles are captured, such as 186c having the same payload as 186a and 186b, and 188b having the same payload as 188a.

Signal Encoder and Decoder

Figure 10:
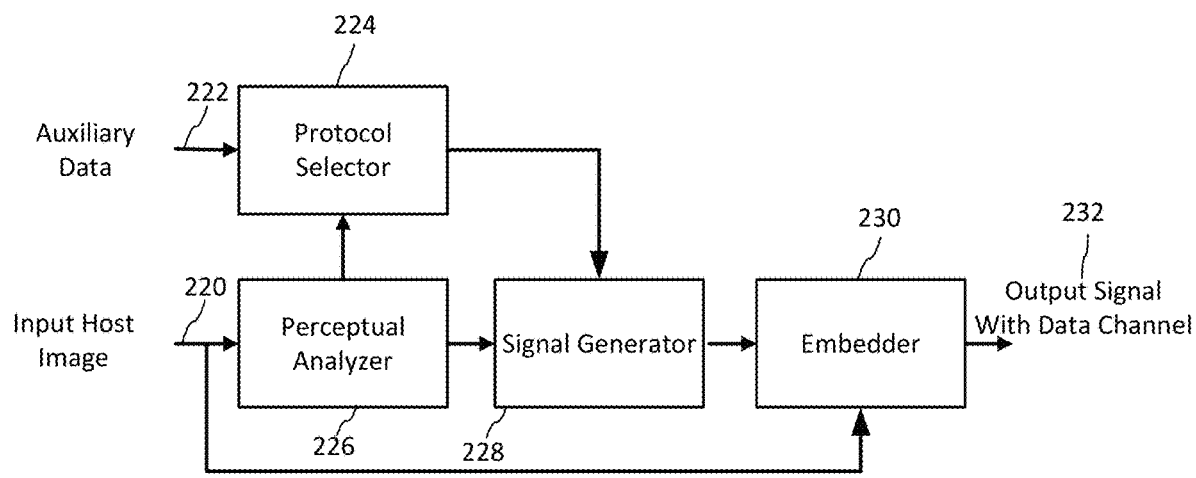
FIG. 10 is a block diagram of a signal encoder for encoding a digital payload signal into an image signal, such as artwork for product packaging
Figure 11:
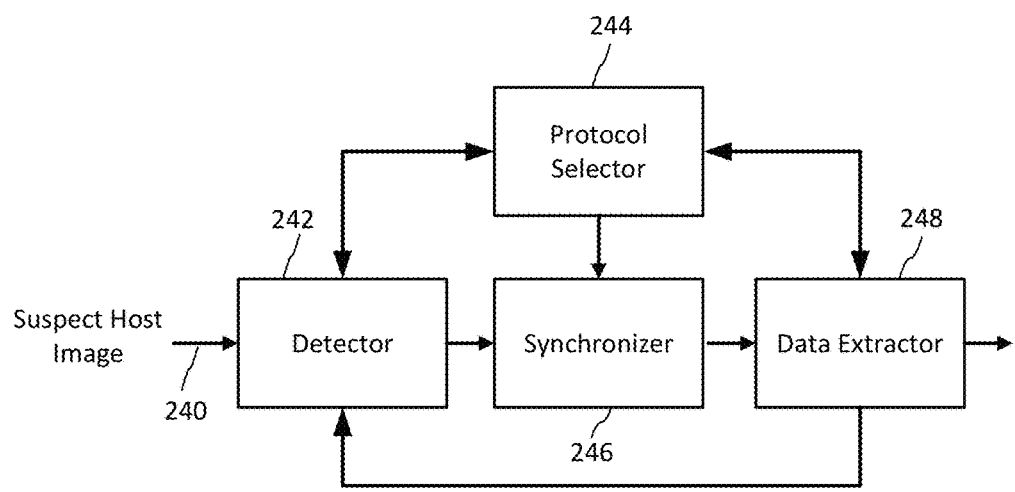
FIG. 11 is a block diagram of a compatible signal decoder for extracting the digital payload signal from a captured image signal.

FIG. 10 is a block diagram of a signal encoder for encoding a digital payload signal into an image signal. FIG. 11 is a block diagram of a compatible signal decoder for extracting the digital payload signal from an image signal.

While the signal encoder and decoder may be used for communicating a data channel for many applications, the objective for use in physical objects is robust signal communication through images formed on and captured from these objects. Signal encoders and decoders, like those in the Digimarc Barcode Platform from Digimarc Corporation, communicate auxiliary data in a data carrier (watermark) within image content. Encoding and decoding is applied digitally, yet the signal survives digital to analog transformation and analog to digital transformation. For example, the encoder generates a modulated image that is converted to a rendered form, such as a printed label. Prior to decoding, a receiving device has an imager to capture the modulated signal, convert it to an electric signal, which is digitized and then processed by the decoder.

Inputs to the signal encoder include a host image 220 and auxiliary data payload 222. The objectives of the encoder include encoding a robust signal with desired payload capacity per unit of host signal (e.g., the spatial area of a two-dimensional tile), while maintaining perceptual quality. In some cases, there may be very little variability or presence of a host signal. In this case, there is little host interference on the one hand, yet little host content in which to mask the presence of the data channel within an image. Some examples include a package design that is devoid of much image variability (e.g., a single, uniform color). See, e.g., patent application Ser. No. 14/725,399, filed May 29, 2015 (now U.S. Pat. No. 9,635,378), and 62/303,320, filed Mar. 3, 2016, both entitled SPARSE MODULATION FOR ROBUST SIGNALING AND SYNCHRONIZATION and both incorporated herein by reference.

The auxiliary data payload 222 includes the variable data information to be conveyed in the data channel, possibly along with other protocol data used to facilitate the communication. The protocol of the auxiliary data encoding scheme comprises the format of the auxiliary data payload, error correction coding schemes, payload modulation methods (such as the carrier signal, spreading sequence, encoded payload scrambling or encryption key), signal structure (including mapping of modulated signal to embedding locations within a tile), error detection in payload (CRC, checksum, etc.), perceptual masking method, host signal insertion function (e.g., how auxiliary data signal is embedded in or otherwise combined with host image signal in a package or label design), and synchronization method and signals.

The protocol defines the manner in which the signal is structured and encoded for robustness, perceptual quality or data capacity. For a particular application, there may be a single protocol, or more than one protocol, depending on application requirements. Examples of multiple protocols include cases where there are different versions of the channel, different channel types (e.g., several digital watermark layers within a host). Different versions may employ different robustness encoding techniques or different data capacity. Protocol selector module 224 determines the protocol to be used by the encoder for generating a data signal. It may be programmed to employ a particular protocol depending on the input variables, such as user control, application specific parameters, or derivation based on analysis of the host signal.

Perceptual analyzer module 226 analyzes the input host signal to determine parameters for controlling signal generation and embedding, as appropriate. It is not necessary in certain applications, while in others it may be used to select a protocol and/or modify signal generation and embedding operations. For example, when encoding in host color images that will be printed, the perceptual analyzer 156 is used to ascertain color content and masking capability of the host image. The output of this analysis, along with the rendering method (printing device) and rendered output form (e.g., ink and substrate) is used to control auxiliary signal encoding in particular color channels (e.g., one or more channels of process inks, Cyan, Magenta, Yellow, or Black (CMYK) or spot colors), perceptual models, and signal protocols to be used with those channels. Please see, e.g., our work on visibility and color models used in perceptual analysis in our U.S. application Ser. No. 14/616,686 (now published as US 2015-0156369), Ser. No. 14/588,636 (now published as US 2015-0187039), and Ser. No. 12/337,029 (now published as US 2010-0150434), and Ser. No. 13/975,919 (now U.S. Pat. No. 9,449,357), and in U.S. Pat. No. 7,352,878, which are hereby incorporated by reference.

The perceptual analyzer module 226 also computes a perceptual model, as appropriate, to be used in controlling the modulation of a data signal onto a data channel within image content as described below.

The signal generator module 228 operates on the auxiliary data and generates a data signal according to the protocol. It may also employ information derived from the host signal, such as that provided by perceptual analyzer module 226, to generate the signal. For example, the selection of data code signal and pattern, the modulation function, and the amount of signal to apply at a given embedding location may be adapted depending on the perceptual analysis, and in particular on the perceptual model and perceptual mask that it generates. Please see below and the incorporated patent documents for additional aspects of this process.

Embedder module 230 takes the data signal and modulates it into an image by combining it with the host image. The operation of combining may be an entirely digital signal processing operation, such as where the data signal modulates the host signal digitally, may be a mixed digital and analog process or may be purely an analog process (e.g., where rendered output images, with some signals being modulated data and others being host image content, such as the various layers of a package design file).

There are a variety of different functions for combining the data and host in digital operations. One approach is to adjust the host signal value as a function of the corresponding data signal value at an embedding location, which is limited or controlled according to the perceptual model and a robustness model for that embedding location. The adjustment may be altering the host image by adding a scaled data signal or multiplying by a scale factor dictated by the data signal value corresponding to the embedding location, with weights or thresholds set on the amount of the adjustment according to the perceptual model, robustness model, and available dynamic range. The adjustment may also be altering by setting the modulated host signal to a particular level (e.g., quantization level) or moving it within a range or bin of allowable values that satisfy a perceptual quality or robustness constraint for the encoded data.

As detailed further below, the signal generator produces a data signal with data elements that are mapped to embedding locations in a tile. These data elements are modulated onto the host image at the embedding locations. A tile is a pattern of embedding locations. The tile derives its name from the way in which it is repeated in contiguous blocks of a host signal, but it need not be arranged this way. In image-based encoders, we commonly use tiles in the form of a two dimensional array (e.g., 128 by 128, 256 by 256, 512 by 512) of embedding locations. The embedding locations correspond to host signal samples at which an encoded signal element is embedded in an embedding domain, such as a spatial domain (e.g., pixels at a spatial resolution), frequency domain (frequency components at a frequency resolution), or some other feature space. We sometimes refer to an embedding location as a bit cell, referring to a unit of data (e.g., an encoded bit or chip element) encoded within a host signal at the location of the cell. Again please see the documents incorporated herein for more information on variations for particular type of media.

The operation of combining may include one or more iterations of adjustments to optimize the modulated host for perceptual quality or robustness constraints. One approach, for example, is to modulate the host image so that it satisfies a perceptual quality metric as determined by perceptual model (e.g., visibility model) for embedding locations across the signal. Another approach is to modulate the host image so that it satisfies a robustness metric across the signal. Yet another is to modulate the host image according to both the robustness metric and perceptual quality metric derived for each embedding location. The incorporated documents provide examples of these techniques. Below, we highlight a few examples. See, e.g., U.S. application Ser. No. 13/975,919 (now U.S. Pat. No. 9,449,357). See also, U.S. application Ser. No. 14/588,636, entitled FULL-COLOR VISIBILITY MODEL USING CSF WHICH VARIES SPATIALLY WITH LOCAL LUMINANCE (published as 2015-0187039), and U.S. Provisional application 62/152,745, entitled DATA HIDING USING EQUAL VISIBILITY EMBEDDING FOR COLOR DESIGNS, filed Apr. 24, 2015, which are hereby incorporated by reference.

For color images, the perceptual analyzer generates a perceptual model that evaluates visibility of an adjustment to the host by the embedder and sets levels of controls to govern the adjustment (e.g., levels of adjustment per color direction, and per masking region). This may include evaluating the visibility of adjustments of the color at an embedding location (e.g., units of noticeable perceptual difference in color direction in terms of CIE Lab values), Contrast Sensitivity Function (CSF), spatial masking model (e.g., using techniques described by Watson in US Published Patent Application No. US 2006-0165311 A1, which is incorporated by reference herein), etc. One way to approach the constraints per embedding location is to combine the data with the host at embedding locations and then analyze the difference between the encoded host with the original. The perceptual model then specifies whether an adjustment is noticeable based on the difference between a visibility threshold function computed for an embedding location and the change due to embedding at that location. The embedder then can change or limit the amount of adjustment per embedding location to satisfy the visibility threshold function. Of course, there are various ways to compute adjustments that satisfy a visibility threshold, with different sequence of operations. See, e.g., our U.S. application Ser. No. 14/616,686 (now U.S. Pat. No. 9,380,186), Ser. No. 14/588,636 (now U.S. Pat. No. 9,401,001) and Ser. No. 13/975,919 (now U.S. Pat. No. 9,449,357), Patent Application Publication 20100150434, and U.S. Pat. No. 7,352,878, already incorporated herein.

The embedder also computes a robustness model. The computing of a robustness model may include computing a detection metric for an embedding location or region of locations. The approach is to model how well the decoder will be able to recover the data signal at the location or region. This may include applying one or more decode operations and measurements of the decoded signal to determine how strong or reliable the extracted signal. Reliability and strength may be measured by comparing the extracted signal with the known data signal. Below, we detail several decode operations that are candidates for detection metrics within the embedder. One example is an extraction filter which exploits a differential relationship to recover the data signal in the presence of noise and host signal interference. At this stage of encoding, the host interference is derivable by applying an extraction filter to the modulated host. The extraction filter models data signal extraction from the modulated host and assesses whether the differential relationship needed to extract the data signal reliably is maintained. If not, the modulation of the host is adjusted so that it is.

Detection metrics may be evaluated such as by measuring signal strength as a measure of correlation between the modulated host and variable or fixed data components in regions of the host, or measuring strength as a measure of correlation between output of an extraction filter and variable or fixed data components. Depending on the strength measure at a location or region, the embedder changes the amount and location of host signal alteration to improve the correlation measure. These changes may be particularly tailored so as to establish relationships of the data signal within a particular tile, region in a tile or bit cell pattern of the modulated host. To do so, the embedder adjusts bit cells that violate the relationship so that the relationship needed to encode a bit (or M-ary symbol) value is satisfied and the thresholds for perceptibility are satisfied. Where robustness constraints are dominant, the embedder will exceed the perceptibility threshold where necessary to satisfy a desired robustness threshold.

The robustness model may also model distortion expected to be incurred by the modulated host, apply the distortion to the modulated host, and repeat the above process of measuring detection metrics and adjusting the amount of alterations so that the data signal will withstand the distortion. See, e.g., earlier-cited patent application Ser. No. 14/616,686 (now U.S. Pat. No. 9,380,186), Ser. No. 14/588,636 (now U.S. Pat. No. 9,401,001) and Ser. No. 13/975,919 (now U.S. Pat. No. 9,449,357) for image related processing.

This modulated host is then output as an output image signal 232, with a data channel encoded in it. The operation of combining also may occur in the analog realm where the data signal is transformed to a rendered form, such as a layer of ink or coating applied by a commercial press to a substrate. Another example is a data signal that is overprinted as a layer of material, engraved in, or etched onto a substrate, where it may be mixed with other signals applied to the substrate by similar or other marking methods. In these cases, the embedder employs a predictive model of distortion and host signal interference, and adjusts the data signal strength so that it will be recovered more reliably. The predictive modeling can be executed by a classifier that classifies types of noise sources or classes of host image and adapts signal strength and configuration of the data pattern to be more reliable to the classes of noise sources and host image signals that the encoded data signal is likely to be encounter or be combined with.

The output 232 from the embedder signal typically incurs various forms of distortion through its distribution or use. For printed objects, this distortion occurs through rendering an image with the encoded signal in the printing process, and subsequent scanning back to a digital image via a camera or like image sensor.

Turning to FIG. 11, the signal decoder receives an encoded host signal 240 and operates on it with one or more processing stages to detect a data signal, synchronize it, and extract data. This signal decoder corresponds to a type of recognition unit in FIG. 7 and watermark processor in FIG. 8.

The decoder is paired with an input device in which a sensor captures an analog form of the signal and an analog to digital converter converts it to a digital form for digital signal processing. Though aspects of the decoder may be implemented as analog components, e.g., such as preprocessing filters that seek to isolate or amplify the data channel relative to noise, much of the decoder is implemented as digital signal processing modules that implement the signal processing operations within a scanner. As noted, these modules are implemented as software instructions executed within the scanner, an FPGA, or ASIC.

The detector 242 is a signal processing module that detects presence of the data channel. The incoming signal is referred to as a suspect host because it may not have a data channel or may be so distorted as to render the data channel undetectable. The detector is in communication with a protocol selector 244 to get the protocols it uses to detect the data channel. It may be configured to detect multiple protocols, either by detecting a protocol in the suspect signal and/or inferring the protocol based on attributes of the host signal or other sensed context information. A portion of the data signal may have the purpose of indicating the protocol of another portion of the data signal. As such, the detector is shown as providing a protocol indicator signal back to the protocol selector 244.

The synchronizer module 246 synchronizes the incoming signal to enable data extraction. Synchronizing includes, for example, determining the distortion to the host signal and compensating for it. This process provides the location and arrangement of encoded data elements within the host signal.

The data extractor module 248 gets this location and arrangement and the corresponding protocol and demodulates a data signal from the host. The location and arrangement provide the locations of encoded data elements. The extractor obtains estimates of the encoded data elements and performs a series of signal decoding operations.

As detailed in examples below and in the incorporated documents, the detector, synchronizer and data extractor may share common operations, and in some cases may be combined. For example, the detector and synchronizer may be combined, as initial detection of a portion of the data signal used for synchronization indicates presence of a candidate data signal, and determination of the synchronization of that candidate data signal provides synchronization parameters that enable the data extractor to apply extraction filters at the correct orientation, scale and start location of a tile. Similarly, data extraction filters used within data extractor may also be used to detect portions of the data signal within the detector or synchronizer modules. The decoder architecture may be designed with a data flow in which common operations are re-used iteratively, or may be organized in separate stages in pipelined digital logic circuits so that the host data flows efficiently through the pipeline of digital signal operations with minimal need to move partially processed versions of the host data to and from a shared memory unit, such as a RAM memory.

Signal Generator

Figure 12:
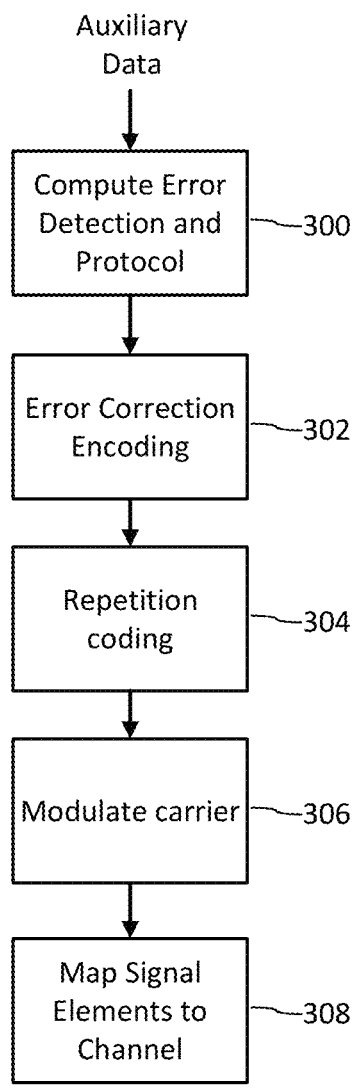
FIG. 12 is a flow diagram illustrating operations of a signal generator.

FIG. 12 is a flow diagram illustrating operations of a signal generator. Each of the blocks in the diagram depict processing modules that transform the input auxiliary data (e.g., GTIN or other item identifier) into a digital payload data signal structure. For a given protocol, each block provides one or more processing stage options selected according to the protocol. In processing module 300, the auxiliary data payload is processed to compute error detection bits, e.g., such as a Cyclic Redundancy Check, Parity, check sum or like error detection message symbols. Additional fixed and variable messages used in identifying the protocol and facilitating detection, such as synchronization signals may be added at this stage or subsequent stages.

Error correction encoding module 302 transforms the message symbols of the digital payload signal into an array of encoded message elements (e.g., binary or M-ary elements) using an error correction method. Examples include block codes, BCH, Reed Solomon, convolutional codes, turbo codes, etc.

Repetition encoding module 304 repeats and concatenates the string of symbols from the prior stage to improve robustness. For example, certain message symbols may be repeated at the same or different rates by mapping them to multiple locations within a unit area of the data channel (e.g., one unit area being a tile of bit cells, as described further below).

Repetition encoding may be removed and replaced entirely with error correction coding. For example, rather than applying convolutional encoding (1/3 rate) followed by repetition (repeat three times), these two can be replaced by convolution encoding to produce a coded payload with approximately the same length.

Next, carrier modulation module 306 takes message elements of the previous stage and modulates them onto corresponding carrier signals. For example, a carrier might be an array of pseudorandom signal elements, with equal number of positive and negative elements (e.g., 16, 32, 64 elements), or other waveform. We elaborate further on signal configurations below.

Mapping module 308 maps signal elements of each modulated carrier signal to locations within the channel. In the case where a digital host signal is provided, the locations correspond to embedding locations within the host signal. The embedding locations may be in one or more coordinate system domains in which the host signal is represented within a memory of the signal encoder. The locations may correspond to regions in a spatial domain, temporal domain, frequency domain, or some other transform domain. Stated another way, the locations may correspond to a vector of host signal features, which are modulated to encode a data signal within the features.

Mapping module 308 also maps a synchronization signal to embedding locations within the host signal, for embodiments employing an explicit synchronization signal. An explicit synchronization signal is described further below.

To accurately recover the payload, the decoder must be able to extract estimates of the coded bits at the embedding locations within each tile. This requires the decoder to synchronize the image under analysis to determine the embedding locations. For images, where the embedding locations are arranged in two dimensional blocks within a tile, the synchronizer determines rotation, scale and translation (origin) of each tile. This may also involve approximating the geometric distortion of the tile by an affine transformation that maps the embedded signal back to its original embedding locations.

To facilitate synchronization, the auxiliary signal may include an explicit or implicit synchronization signal. An explicit synchronization signal is an auxiliary signal separate from the encoded payload that is embedded with the encoded payload, e.g., within the same tile). An implicit synchronization signal is a signal formed with the encoded payload, giving it structure that facilitates geometric/temporal synchronization. Examples of explicit and implicit synchronization signals are provided in our previously cited U.S. Pat. Nos. 6,614,914, and 5,862,260.

In particular, one example of an explicit synchronization signal is a signal comprised of a set of sine waves, with pseudo-random phase, which appear as peaks in the Fourier domain of the suspect signal. See, e.g., U.S. Pat. Nos. 6,614,914, and 5,862,260, describing use of a synchronization signal in conjunction with a robust data signal. Also see U.S. Pat. No. 7,986,807, which is hereby incorporated by reference.

Our US Publication 20120078989, which is hereby incorporated by reference, provides additional methods for detecting an embedded signal with this type of structure and recovering rotation, scale and translation from these methods.

Examples of implicit synchronization signals, and their use, are provided in U.S. Pat. Nos. 6,614,914 and 5,862,260, as well as U.S. Pat. Nos. 6,625,297 and 7,072,490, and U.S. application Ser. No. 14/724,729 (now U.S. Pat. No. 9,747, 656), which are hereby incorporated by reference.

Signal Embedding in Host

Figure 13:
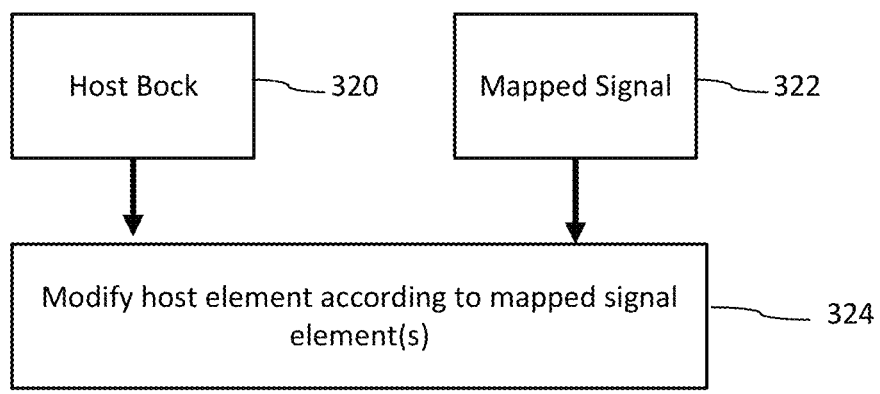
FIG. 13 is a diagram illustrating embedding of an auxiliary signal into host image signal.

FIG. 13 is a diagram illustrating embedding of an auxiliary signal into host signal. As shown, the inputs are a host signal block (e.g., blocks of a host digital image, such as container or label artwork) (320) and an encoded auxiliary signal (322), which is to be inserted into the signal block. The encoded auxiliary signal may include an explicit synchronization component, or the encoded payload may be formulated to provide an implicit synchronization signal. Processing block 324 is a routine of software instructions or equivalent digital logic configured to insert the mapped signal(s) into the host by adjusting the corresponding host signal sample(s) at an embedding location according to the value of the mapped signal element. For example, the mapped signal is added/subtracted from corresponding a sample value, with scale factor and threshold from the perceptual model or like mask controlling the adjustment amplitude. In implementations with an explicit synchronization signal, the encoded payload and synchronization signals may be combined and then added, or added separately with separate mask coefficients to control the signal amplitude independently.

Applying the method of FIG. 12, the product or label identifier (e.g., in GTIN format) are formatted into a binary sequence, which is encoded and mapped to the embedding locations of a tile. For sake of illustration, we describe an implementation of a tile having 256 by 256 embedding locations, where the embedding locations correspond to spatial domain embedding locations within an image. In particular, the spatial locations correspond to pixel samples at a configurable spatial resolution, such as 100-400 DPI. In this example, we will explain the case where the spatial resolution of the embedded signal is 300 DPI, for an embodiment where the resulting image with encode data is printed on a package or label material, such as a paper, plastic or like substrate. The payload is repeated in contiguous tiles each comprised of 256 by 256 of embedding locations. With these embedding parameters, an instance of the payload is encoded in each tile. The physical size of a tile depends on the size of the elemental encoding unit being used (e.g., a single pixel, or a square array of pixels—such as 4×4). Depending on the parameters chosen, each printed tile may range from less than half an inch on a side, to an inch or more. The particular parameters are selected in accordance with the constraints of the particular environment (e.g., reading distance and imaging resolution). Desirably, multiple tiles are redundantly arrayed across the artwork, providing added robustness. An alternative to achieving desired payload capacity is to encode a portion of the payload in smaller tiles, e.g., 128 by 128, and use a protocol indicator to specify the portion of the payload conveyed in each 128 by 128 tile. Erasure codes may be used to convey different payload components per tile and then assemble the components in the decoder, as elaborated upon below.

Following the construction of the payload, error correction coding is applied to the binary sequence. This implementation applies a convolutional coder at rate 1/4, which produces an encoded payload signal of 4096 bits. Each of these bits is modulated onto a binary antipodal, pseudorandom carrier sequence (−1, 1) of length 16, e.g., by multiplying or XORing the payload bit with the binary equivalent of chip elements in its carrier to yield 4096 modulated carriers, for a signal comprising 65,536 elements. These elements map to the 65,536 embedding locations in each of the 256 by 256 tiles.

An alternative embodiment, for robust encoding on packaging employs tiles of 128 by 128 embedding locations. Through convolutional coding of an input payload at rate 1/3 and subsequent repetition coding, an encoded payload of 1024 bits is generated. Each of these bits is modulated onto a similar carrier sequence of length 16, and the resulting 16,384 signal elements are mapped to the 16,384 embedding locations within the 128 by 128 tile.

There are several alternatives for mapping functions to map the encoded payload to embedding locations. In one, these elements have a pseudorandom mapping to the embedding locations. In another, they are mapped to bit cell patterns of differentially encoded bit cells as described in Ser. No. 14/724,729, incorporated above. In the latter, the tile size may be increased to accommodate the differential encoding of each encoded bit in a pattern of differential encoded bit cells, where the bit cells corresponding to embedding locations at a target resolution (e.g., 300 DPI).

Our patent application Ser. Nos. 14/725,399 and 62/303,320, incorporated above, describe methods for inserting auxiliary signals in areas of package and label designs that have little host image variability. These methods are particularly useful for labels.

For an explicit synchronization signal, the mapping function maps a discrete digital image of the synchronization signal to the host image block. For example, where the synchronization signal comprises a set of Fourier magnitude peaks or sinusoids with pseudorandom phase, the synchronization signal is generated in the spatial domain in a block size coextensive with the 256 by 256 tile (or other tile size, e.g., 128 by 128) at target embedding resolution.

Various detailed examples of encoding protocols and processing stages of these protocols are provided in our prior work, such as our U.S. Pat. Nos. 6,614,914, 5,862,260, and 6,674,876, which are hereby incorporated by reference, and US Patent Publications 20100150434 and Ser. No. 14/725,399, previously incorporated. More background on signaling protocols, and schemes for managing compatibility among protocols, are provided in U.S. Pat. No. 7,412,072, which is hereby incorporated by reference.

One signaling approach, which is detailed in U.S. Pat. Nos. 6,614,914, and 5,862,260, is to map elements to pseudo-random locations within a channel defined by a domain of a host signal. See, e.g., FIG. 9 of U.S. Pat. No. 6,614,914. In particular, elements of a watermark signal are assigned to pseudo-random embedding locations within an arrangement of sub-blocks within a block (referred to as a "tile"). The elements of this watermark signal correspond to error correction coded bits output from an implementation of stage 304 of FIG. 12. These bits are modulated onto a pseudo-random carrier to produce watermark signal elements (block 306 of FIG. 12), which in turn, are assigned to the pseudorandom embedding locations within the sub-blocks (block 308 of FIG. 12). An embedder module modulates this signal onto a host signal by increasing or decreasing host signal values at these locations for each error correction coded bit according to the values of the corresponding elements of the modulated carrier signal for that bit.

While the watermark signal is most commonly integrated into the artwork, and is printed with the same inks as are used to print the artwork, in other embodiments this need not be the case. One such arrangement prints a watermark pattern in an ink (e.g., a varnish) that seems transparent to human inspection but that actually effects a narrowband modulation within the visible light spectrum, and can be discerned by computer analysis of captured imagery. Details of such arrangements are provided in our patent application 62/263,369, filed Dec. 4, 2015, entitled DIGITAL WATERMARKING AND DATA HIDING WITH NARROWBAND ABSORPTION MATERIALS, which is incorporated herein by reference. Another such arrangement employs an ink that is transparent (clear) to visible light but absorbs wavelengths in the ultraviolet or infrared range. Because such watermarks employ inks not otherwise used for the packaging artwork, they can be applied separately—either before or after printing of the visible artwork.

Combinations of such arrangements can also be employed. For example, a GTIN identifier can be encoded in a watermark integrated with, and printed with, the packaging artwork. And a second identifier (e.g., a label identifier) can be applied by the method of just-cited application 62/263,369.

If two watermarks are applied separately, they can be applied so as to be mis-aligned (e.g., with a spatial offset between their respective tile origins). If printed on rolling presses, such offset can be randomized by having the two patterns applied by rollers of slightly different diameters. Due to varying diameters of such rollers, miles of material may be printed before the two rollers return to an original relative alignment. Such randomization of the spatial offset effects a form of virtual serialization, by which one instance of a package can be optically identified, and distinguished from another instance of the same package. For additional details on such technology, please see our application Ser. No. 14/446,068 (now published as US Patent Application 2015-0016664), which is incorporated herein by reference.

Signal Decoding

Figure 14:
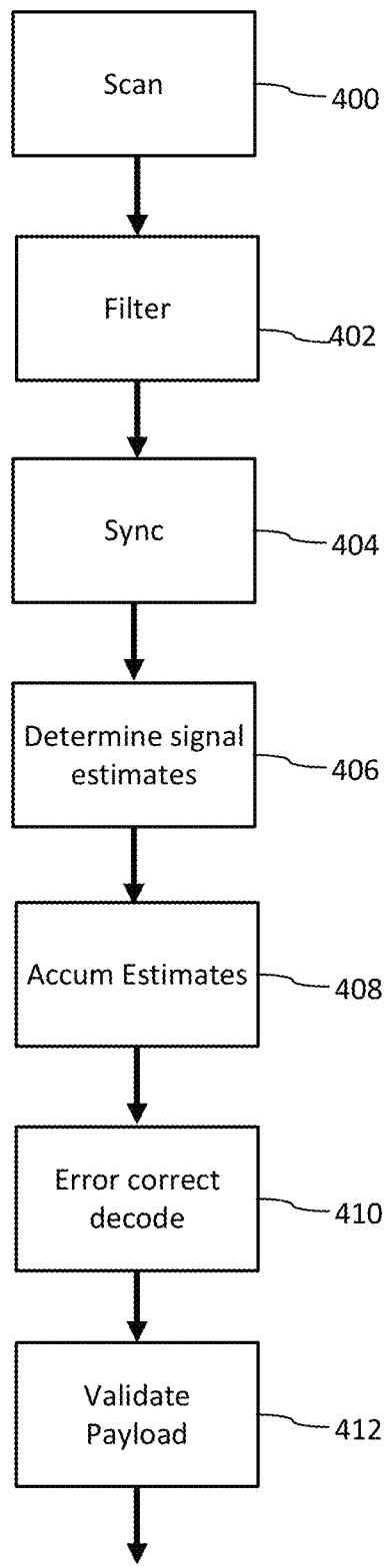
FIG. 14 is a flow diagram illustrating a method for decoding a payload signal from a host image signal.

FIG. 14 is a flow diagram illustrating a method for decoding a payload signal from a captured image frame. This method is a particular embodiment of a recognition unit of FIG. 7, and a watermark processor of FIG. 8. Implementations of recognition unit and watermark processors available from Digimarc Corporation include:

Digimarc Mobile Software Development Kit; and
Digimarc Embedded Systems SDK.

The Embedded Systems SDK is the one typically integrated into machine vision systems for manufacturing line inspection.

Corresponding encoder embodiments available from Digimarc Corporation include:

Digimarc Barcode SDKs
Digimarc Barcode Plugin

Returning to FIG. 14, the frames are captured at a resolution preferably near the resolution at which the auxiliary signal has been encoded within the original image (e.g., 300 DPI). An image up-sampling or down-sampling operation may be performed to convert the image frames supplied by the imager to a target resolution for further decoding.

The resulting image blocks supplied to the decoder from these frames may potentially include an image with the payload. At least some number of tiles of encoded signal may be captured within the field of view, if an object portion with encoded data is being imaged. Otherwise, no encoded tiles will be present. The objective, therefore, is to determine as efficiently as possible whether encoded tiles are present.

In the initial processing of the decoding method, it is advantageous to select frames and blocks within frames that have image content that are most likely to contain the encoded payload. From the image passed to the decoder, the decoder selects image blocks for further analysis. The block size of these blocks is set large enough to span substantially all of a complete tile of encoded payload signal, and preferably a cluster of neighboring tiles.

For more on block selection, please see co-pending U.S. application Ser. No. 14/332,739, entitled FEATURE-BASED WATERMARK LOCALIZATION IN DIGITAL CAPTURE SYSTEMS (published as 20150030201), which is hereby incorporated by reference.

Please also see provisional application 62/174,454, entitled IMAGE BLOCK SELECTION FOR EFFICIENT TIME-LIMITED DECODING, which is hereby incorporated by reference, for more on block selection where processing is time is more limited.

The first stage of the decoding process filters the image to prepare it for detection and synchronization of the encoded signal (402). The decoding process sub-divides the image into blocks and selects blocks for further decoding operations. For color images, a first filtering stage converts the input color image signal (e.g., RGB values) to a color channel or channels where the auxiliary signal has been encoded. See, e.g., 20100150434 for more on color channel encoding and decoding. For an image captured under red illumination by a monochrome scanner, the decoding process operates on this "red" channel sensed by the imager. Some imagers may pulse LEDs of different color to obtain plural color or spectral samples per pixel as described in our Patent Application Publication 2013-0329006, entitled COORDINATED ILLUMINATION AND IMAGE SIGNAL CAPTURE FOR ENHANCED SIGNAL DETECTION, which is hereby incorporated by reference.

A second filtering operation isolates the auxiliary signal from the host image. Pre-filtering is adapted for the auxiliary signal encoding format, including the type of synchronization employed. For example, where an explicit synchronization signal is used, pre-filtering is adapted to isolate the explicit synchronization signal for the synchronization process.

In some embodiments, the synchronization signal is a collection of peaks in the Fourier domain. Prior to conversion to the Fourier domain, the image blocks are pre-filtered. See, e.g., the LaPlacian pre-filter in U.S. Pat. No. 6,614,914. A window function is applied to the blocks and then a transform to the Fourier domain, applying an FFT. Another filtering operation is performed in the Fourier domain. See, e.g., pre-filtering options in U.S. Pat. Nos. 6,988,202, 6,614,914, 20120078989, which are hereby incorporated by reference.

For more on filters, also see U.S. Pat. No. 7,076,082, which is hereby incorporated by reference. This patent describes a multi-axis filter, e.g., an oct-axis filter. Oct axis compares a discrete image sample with eight neighbors to provide eight compare values (e.g., +1 for positive difference, −1 or negative difference), and sums the compare values. Different arrangements of neighbors and weights may be applied to shape the filter according to different functions. Another filter variant is a cross shaped filter, in which a sample of interest is compared with an average of horizontal neighbors and vertical neighbors, which are then similarly summed.

Next, synchronization process (404) is executed on a filtered block to recover the rotation, spatial scale, and translation of the encoded signal tiles. This process may employ a log polar method as detailed in U.S. Pat. No. 6,614,914 or least squares approach of 20120078989 to recover rotation and scale of a synchronization signal comprised of peaks in the Fourier domain. To recover translation, the phase correlation method of U.S. Pat. No. 6,614,914 is used, or phase estimation and phase deviation methods of 20120078989 are used.

Alternative methods perform synchronization on an implicit synchronization signal, e.g., as detailed in Ser. No. 14/724,729.

Next, the decoder steps through the embedding locations in a tile, extracting bit estimates from each location (406). This process applies, for each location, the rotation, scale and translation parameters, to extract a bit estimate from each embedding location (406). In particular, as it visits each embedding location in a tile, it transforms it to a location in the received image based on the affine transform parameters derived in the synchronization, and then samples around each location. It does this process for the embedding location and its neighbors to feed inputs to an extraction filter (e.g., oct axis or cross shaped). A bit estimate is extracted at each embedding location using filtering operations, e.g., oct axis or cross shaped filter (see above), to compare a sample at embedding locations with neighbors. The output (e.g., 1, −1) of each compare operation is summed to provide an estimate for an embedding location. Each bit estimate at an embedding location corresponds to an element of a modulated carrier signal.

The signal decoder estimates a value of each error correction encoded bit by accumulating the bit estimates from the embedding locations of the carrier signal for that bit (408). For instance, in the encoder embodiment above, error correction encoded bits are modulated over a corresponding carrier signal with 16 elements (e.g., multiplied by or XOR with a binary anti-podal signal). A bit value is demodulated from the estimates extracted from the corresponding embedding locations of these elements. This demodulation operation multiplies the estimate by the carrier signal sign and adds the result. This demodulation provides a soft estimate for each error correction encoded bit.

These soft estimates are input to an error correction decoder to produce the payload signal (410). For a convolutional encoded payload, a Viterbi decoder is used to produce the payload signal, including the checksum or CRC. For other forms of error correction, a compatible decoder is applied to reconstruct the payload. Examples include block codes, BCH, Reed Solomon, Turbo codes.

Next, the payload is validated by computing the check sum and comparing with the decoded checksum bits (412). The check sum matches the one in the encoder. For the example above, the decoder computes a CRC for a portion of the payload and compares it with the CRC portion in the payload.

At this stage, the payload is stored in shared memory of the decoder process. The recognition unit in which the decoder process resides returns it to the controller via its interface. This may be accomplished by various communication schemes, such as IPC, shared memory within a process, DMA, etc.

Further Disclosure

Figure 15:
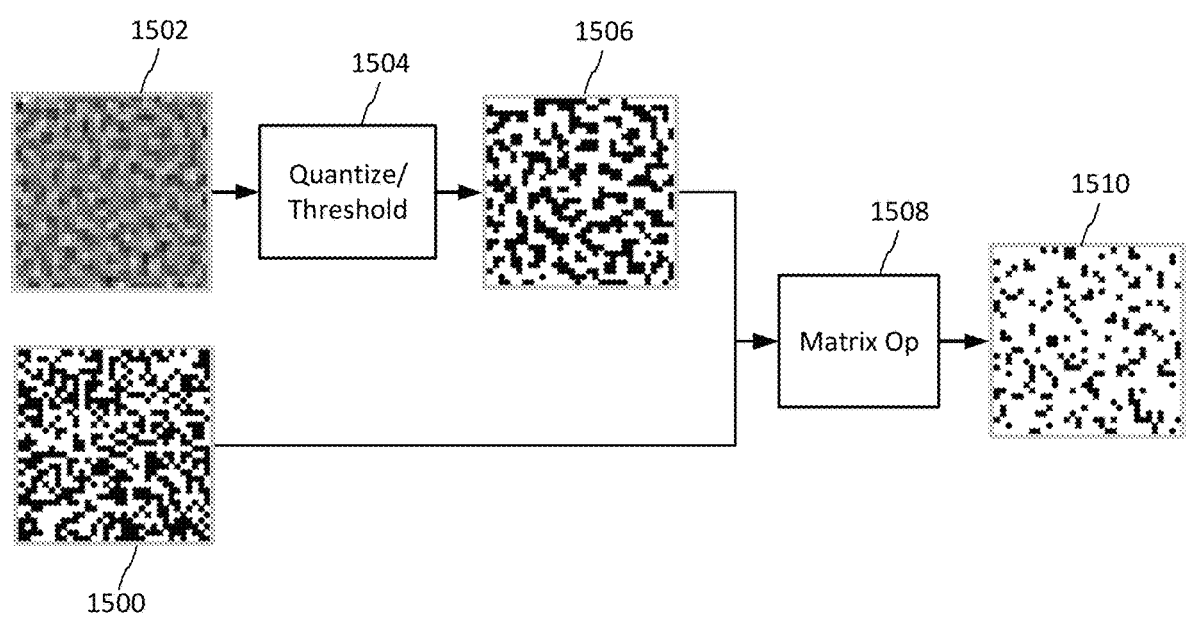
FIG. 15 is an example of a sparse signal generator.

FIG. 15 shows a sparse signal generator, more fully-detailed in earlier incorporated-by-reference U.S. Pat. No. 9,635,378.

The signal generator starts with a tile of two signal components, one carrying variable data 1500, and one providing a synchronization function 1502. The synchronization signal is multi-valued per pixel, and it is passed through a quantizer 1504 to convert it to a signal with fewer levels per pixel. In its simplest form, the quantizer converts the multi-valued signal into a binary signal, represented as black and white pixels, by a threshold operation. The threshold operation for each pixel within a tile compares each value with a threshold. For binary signals, elements below the threshold are shown as black here, while elements above the threshold are white. As noted, this is simply representative of a modulation state of an optical property at a sparse element, such as darker or lighter relative to background, and is not particularly limited to rendering black and white pixels.

The variable data signal 1500 is comprised of elements having one of two values (e.g., 1 or 0, A, −A). As explained previously, a payload signal may be transformed into a robust data signal through one or more modulation stages, e.g., error correction and modulating the error correction coded signal onto a binary carrier signal, which is the approach used in this embodiment. This modulated carrier is mapped to pixel locations within the tile to form data tile 1500.

The signal generator of FIG. 15 produces a sparse signal by selectively combining elements of data tile 1500 with the quantized synchronization signal 1506. In the embodiment illustrated here, the signal generator performs a matrix operation 1508 that selectively retains components of the data and synchronization tiles, while producing a sparse signal output 1510. One particular matrix operation to generate dark sparse elements on a lighter background, as shown here, is to compute a logical AND operation between corresponding pixel locations within the data and synchronization tiles, such that pixels that are both black at the same coordinates in each tile remain black in the output. For other inputs (white AND white, black AND white, or white AND black), the output pixel is white at that coordinate.

In this approach, the black pixels of the message signal are retained at all coordinates in the tile where the synchronization signal also has a black pixel. This technique distributes sparse message elements within a tile according the spatial distribution of the synchronization signal. It ensures that there sufficient signal energy to carry the payload robustly, while preserving sufficient signal energy for synchronization. It also ensures that the sync signal does not interfere with the sparse message elements. This approach may be reversed in the case where the objective is to generate a sparse signal with light holes against a darker background, with quantization level set appropriately (see later illustrations of setting thresholds for holes in dark background).

This approach also demonstrates a signal generation method in which a multi-valued component is effectively merged with a binary component. The multi-valued synchronization tile is a spatial domain representation of synchronization template formed by peaks in the frequency domain. The binary valued payload carrying component is redundantly encoded and distributed over the tile. In particular, modulated carrier elements, with an equal number of binary 0 and 1 values are spread evenly over the spatial locations within a tile.

Figure 16A:
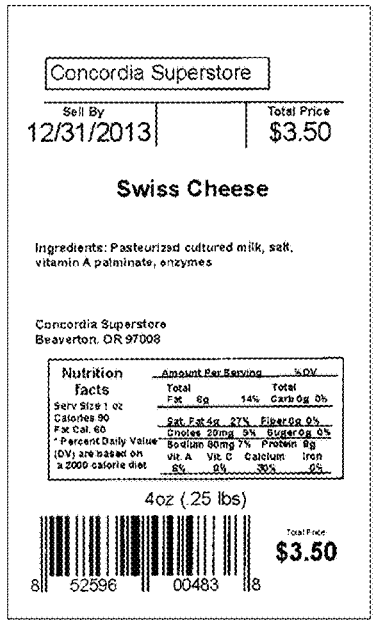
FIG. 16A shows a printed label.
Figure 16B:
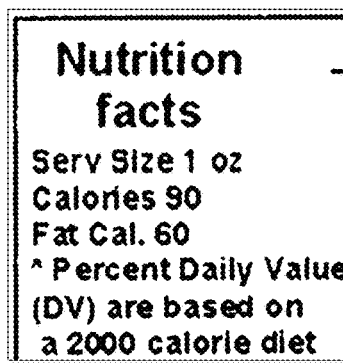
FIGS. 16B and 16C show magnified excerpts from FIG. 16A.
Figure 16C:
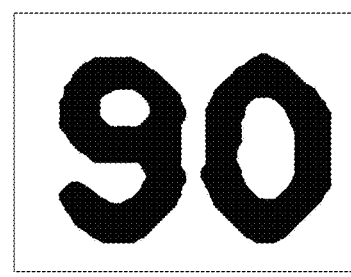

FIG. 16A shows a label as may be adhesively applied to deli food items, such as paper-wrapped packages of cheese or meat, or plastic tubs containing other foodstuffs. Such labels are typically printed in-store, by a thermal label printer, onto thermally-sensitive label media. An exemplary printer is the Dymo SE450. The SE450 has a horizontal linear array of elements, spaced 203 to the inch, that are selectively heated to discolor corresponding dots on a proximate label medium, as the medium is advanced in a vertical direction. FIG. 16B shows a magnified excerpt of FIG. 16A. FIG. 16C shows a magnified excerpt of FIG. 16B.

Figure 17A:
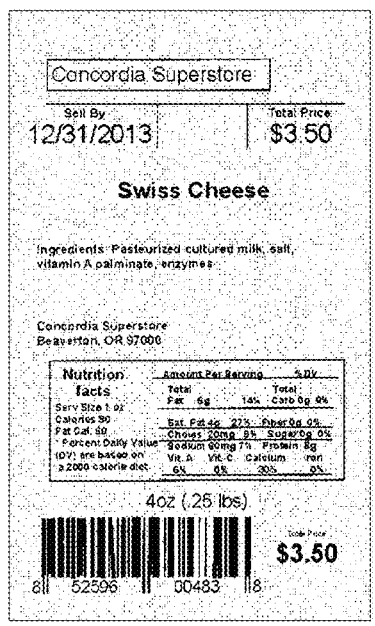
FIG. 17A shows a machine-encoded label.

Artwork printed onto label of FIG. 16A can be modified to include a sparse mark of the sort described above, redundantly encoding a plural-bit message. Such a sparsely-marked label is shown in FIG. 17A. However, as shown in enlarged FIGS. 17B and 17C, legibility of the label is impaired by the markings. (Such markings can also interfere with machine-decoding of the barcode shown at the lower left of FIG. 17A.)

In accordance with a further aspect of the present technology, a guard band is defined that surrounds text characters (and barcodes) included in the label artwork. In a simple embodiment, the sparse mark is added to the artwork only at regions outside the guard band.

Figure 18A:
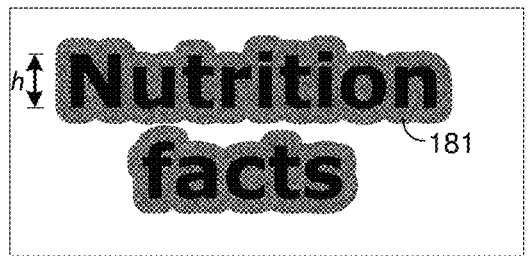
FIG. 18A shows a guard band region defined around printed text.

In one particular embodiment, a dilation process is applied to a pixel representation of the text (and barcode) artwork, such as using conventional image processing software (e.g., GIMP or Adobe Photoshop). FIG. 18A is illustrative. A region-growing process is applied, starting from each pixel of each text character. This process essentially swells each glyph of the text (and barcode) extending a guard band (safe area) 181 around the pixels that comprise such elements of the original label file. No data marking is added within this enlarged guard band.

The width of the guard band depends on the application, and the desired aesthetics. The larger the guard band (up to a point), the easier the label text is to read. In some embodiments, the text can be swollen by just a single pixel in all directions. In other embodiments, the text can be enlarged by 3, 5, or more pixels.

In some implementations, the size of the guard band will be related to the line height (h in FIG. 18A). The guard band may be less than such height (or less than half such height), although larger guard bands are sometimes used.

Regardless of the width of the guard band, any encircled regions within the text character glyphs (e.g., inside encircled parts of the "o" and "a" of FIG. 18A) are desirably included within the guard band.

It will be noted that the boundary of the guard band in FIG. 18A is non-linear; the boundary echoes contours of the letters. While the boundary has a straight portion to the left of the "N," the boundary is non-linear along most of its extent. (In less-favored embodiments, a rectangular guard band may be used to surround an entire block of characters.)

Figure 18B:
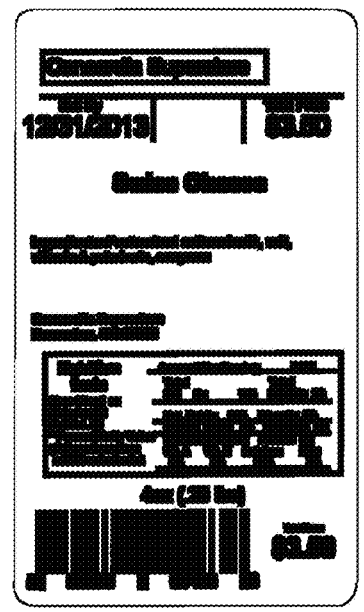
FIG. 18B shows guard band areas associated with the full label of FIG. 16A.

FIG. 18B shows guard band regions for the full label of FIG. 16A.

Figure 17B:
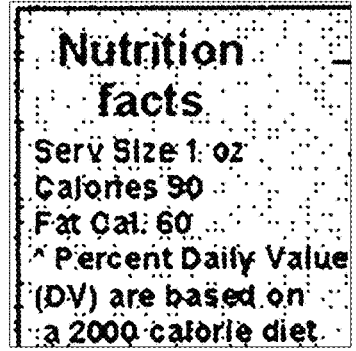
FIGS. 17B and 17C show magnified excerpts from FIG. 17A.
Figure 17C:
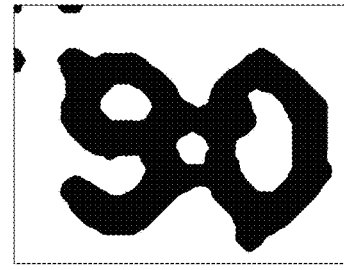
Figure 19A:
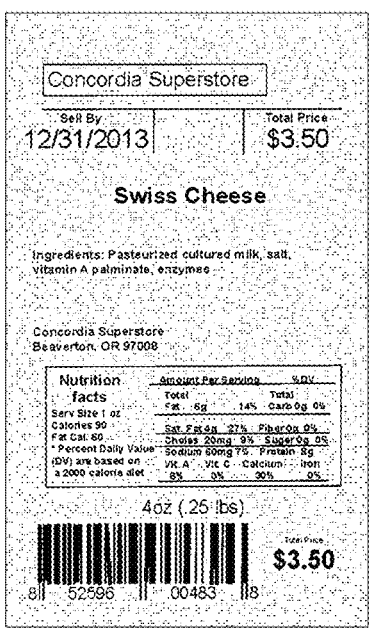
FIG. 19A shows a printed label in which machine encoding is not applied within guard band regions surrounding text.
Figure 19B:
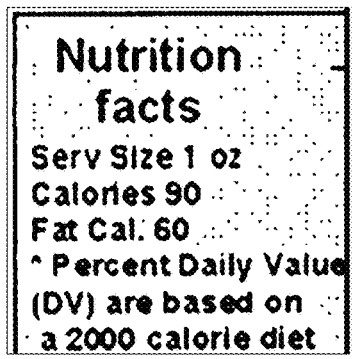
FIGS. 19B and 19C show magnified excerpts from FIG. 19A.
Figure 19C:

FIGS. 19A, 19B and 19C correspond to FIGS. 17A, 17B and 17C, but with the FIG. 18B guard band regions protected from marking as just-described.

Figure 20A:
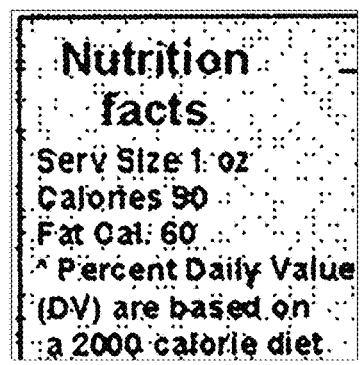
FIGS. 20A and 20B reproduce FIGS. 17B and 19B, side by side.
Figure 20B:
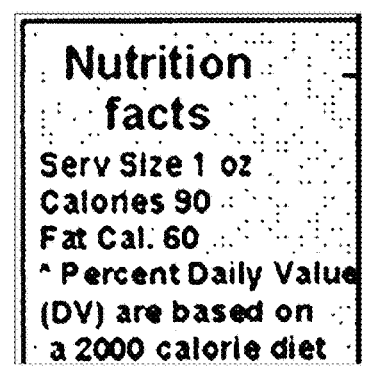

FIGS. 20A and 20B present FIGS. 17B and 19B side by side, enabling comparison of their respective legibilities.

In other embodiments, the marking is not simply applied outside the boundary, and absent within it. Rather, the marking is modulated in intensity (density). Near the text characters, the marking is more subtle. As the distance from the text characters increases, denser marking is applied.

Figure 21:
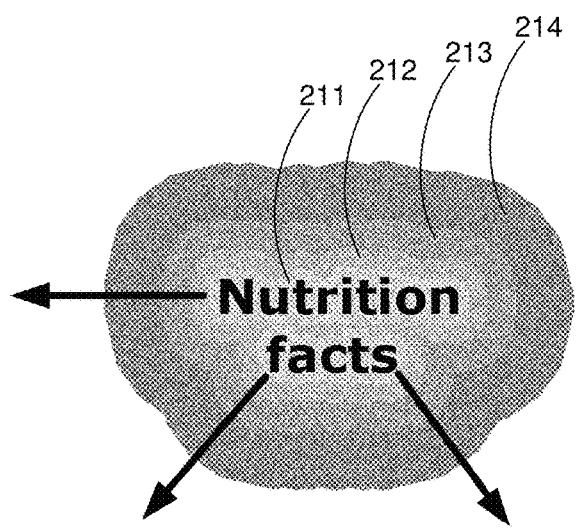
FIG. 21 shows that successively larger regions may surround printed text, enabling machine marking to be applied at different levels of intensity.

This is conceptually illustrated in FIG. 21. In a guard band region 211, no marking is applied. In region 212 (which encloses, or surrounds, the guard band region), a subtle form of marking is applied (which may be called Strength1). In region 213, (which encloses region 212) a slightly stronger marking is applied (which may be called Strength2). In region 214 (which encloses region 213), a somewhat stronger marking is applied (which may be called Strength3). Beyond region 214, the strongest marking is applied (which may be called Strength4). The strength of the marking thus increases along various gradients (shown by the dark arrows in FIG. 21).

Markings of different strengths can be achieved in various ways (some of which were discussed earlier).

Figure 22:
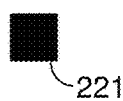
FIG. 22 shows a marking element.

One way is to vary spatial density of the markings. FIG. 22 shows a dark element 221 that can be included at each location in the label artwork where a sparse mark is to be present. With such an element (which may be a single print dot, or pixel, in the thermal printer example or a square array of several such dark pixels, e.g., 2×2 or 3×3), markings of different strengths can be achieved by including elements 221 distributed at different spatial densities.

Figure 23:
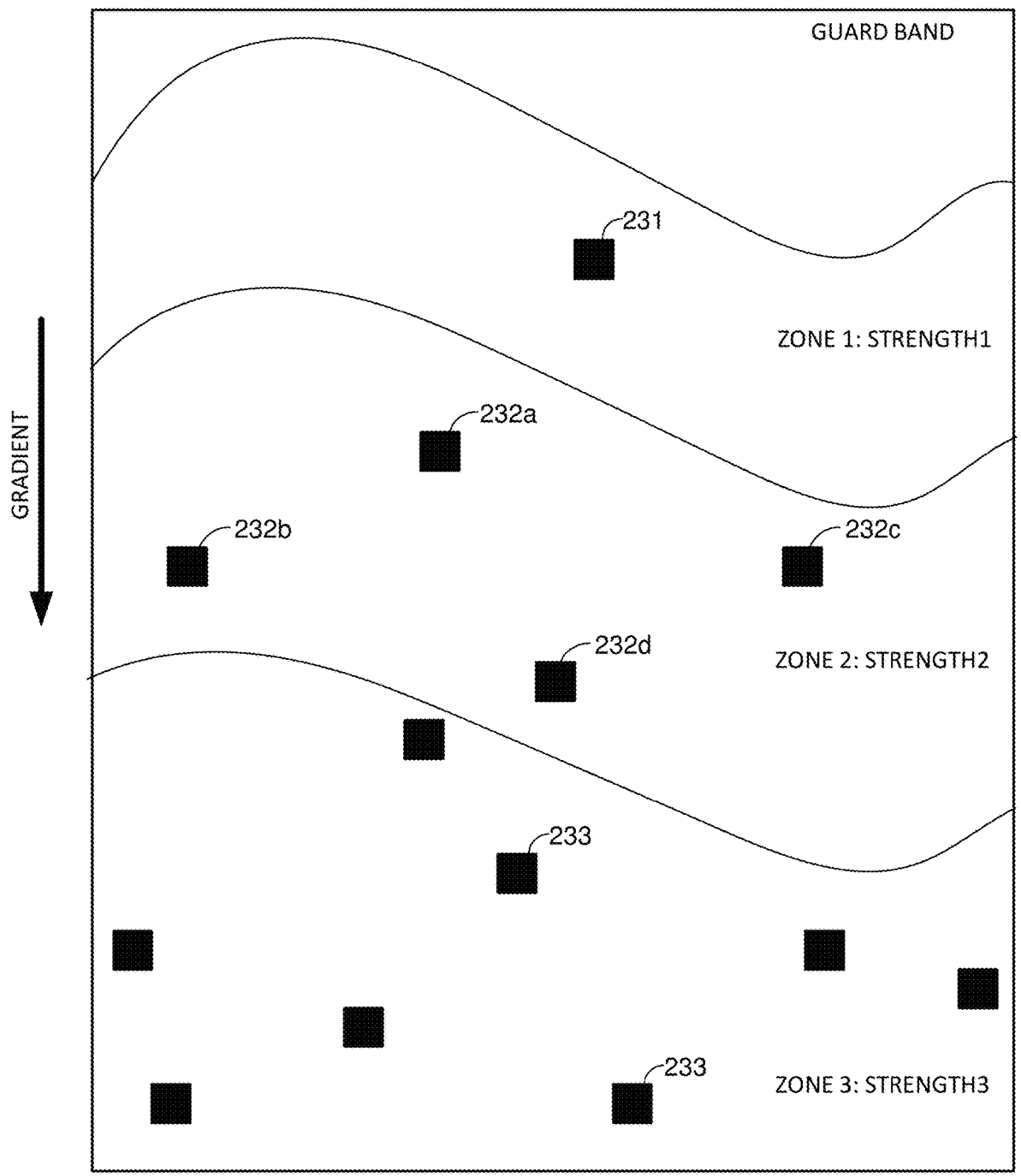
FIG. 23 shows an excerpt of label artwork, including different zones with machine encoding at different strengths.

FIG. 23 shows an excerpt of label artwork. At the top is a guard band adjacent some printed text (not shown). In this guard band, no marking element is included. Beneath, in "Zone 1," is an area in which a marking (i.e., sparse watermark) signal is represented at Strength1, e.g., a density of about 1%. That is, about 1% of the area is darkened by elements 221. Beneath that, in "Zone 2," is an area in which the watermark signal is included at Strength2, e.g., a density of about 2.5% (i.e., about 2.5% of the area is darkened by elements 221). Beneath that is "Zone 3," which is marked at Strength3, e.g., a density of about 4%.

Thus, one way of achieving markings of different strengths is by employing uniform marks, distributed spatially across the label at differing local densities.

The marks are placed within the artwork according to the locations of sparse marks resulting from the earlier-described procedure. The differing densities are achieved by different thresholds T applied to the sync signal, as shown in FIG. 10 of U.S. Pat. No. 9,635,378.

Half of the sync signal elements that are selected by the threshold T will not result in printed dark marks, due to the ANDing with the binary data signal (elements of which are 50%-50% split between its two values). Thus, to achieve a marking with a 1% print density, the threshold T must select the 2% of the sync signal elements having the lowest values. (Likewise, to achieve a marking with 2.5% and 4% print densities, the threshold T must be set to select 5% and 8% of the sync signal elements having the lowest values, respectively.)

As noted, the sync signal is typically a 128×128 element tile, and thus comprises 16,384 elements—each having a value of between 0 and 255. An exemplary sync signal is the sum of dozens of sine functions, causing most of the sync element values to be tightly clustered between about 90 and 160.

If the statistics of the sync function are understood (as is usually the case), the numeric thresholds beneath which, e.g., 2% of its elements are valued, can be determined mathematically. But these thresholds can also be determined heuristically, by stepping a threshold through the range of 0-255 and noting the cumulative percentage of sync signal samples having values equal or lower than each such threshold. Such data collected for an exemplary 128×128 element sync signal tile is shown in FIG. 24A.

By reference to FIG. 24A, it can be seen that setting a threshold value of 102 serves to identify 1.8% of the elements in the sync signal tile (all of which have values of 102 or less). When these identified elements are set to black and ANDed with corresponding elements of the 128×128 data signal tile (as at 1508 in FIG. 15), 0.9% of the 16,384 elements in the composite watermark block are thereby selected for darkening. The thus-identified sparse marking elements are used for printing in Zone 1 of FIG. 23.

Similarly, by setting the sync signal threshold value to 107, 4.6% of the elements in the sync signal are selected. This results in darkening of 2.3% of the elements in the composite watermark block—suitable for printing in Zone 2 of FIG. 23.

Likewise, by setting the sync signal threshold value to 110, 7.5% of the sync signal elements are identified, yielding a print density of 3.75%—suitable for printing in Zone 3 of FIG. 23.

In most embodiments, the sparse 128×128 composite watermark block is spatially mapped to the label by tiling, starting in the upper left corner of the label. Each location on the label corresponds to an element of the sparse block. (Some elements of the sparse block correspond to plural locations on the label, due to tiling.)

The sync signal is typically fixed, for all labels. Accordingly, statistics of the sync signal—once understood—can be re-used in connection with generating sparse marks for different label artworks. In some embodiments, a data structure like the table in FIG. 24A is stored in software used to generate sparse marks—and serves to identify threshold values T needed to achieve different print densities.

In FIG. 23 (as in FIG. 15), the elements that express the marking are all identical. The watermark signal is expressed in a bitonal form: it is there, or it isn't.

Such a representation cannot express any variation in values of the component elements. Sometimes it is useful to express variations in the sync signal in the sparse marking. One such arrangement employs dithered marking blocks, e.g., employing 2×2 or 3×3 blocks of elements.

Figure 25A:
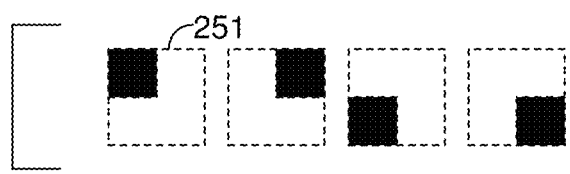
FIGS. 25A, 25B, 25C and 25D show 2×2 marking blocks.
Figure 25B:
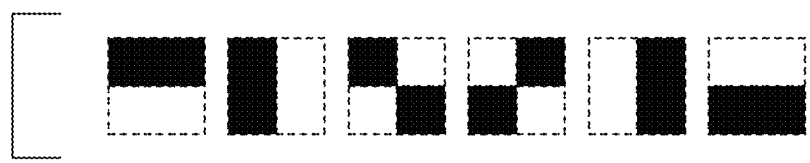
Figure 25C:
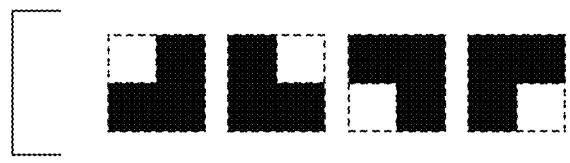
Figure 25D:
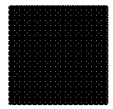

FIG. 25A shows four 2×2 blocks—each of which comprises one dark cell and three light cells. FIG. 25B shows six more such blocks—each of which comprises two dark cells. FIG. 25C shows four blocks comprising three dark cells (i.e., the inverse of FIG. 25A). FIG. 25D shows a block comprised of all dark cells. (The dashed lines serve simply to visually group blocks together; they do not form any part of the printed marking.)

Figure 26A:
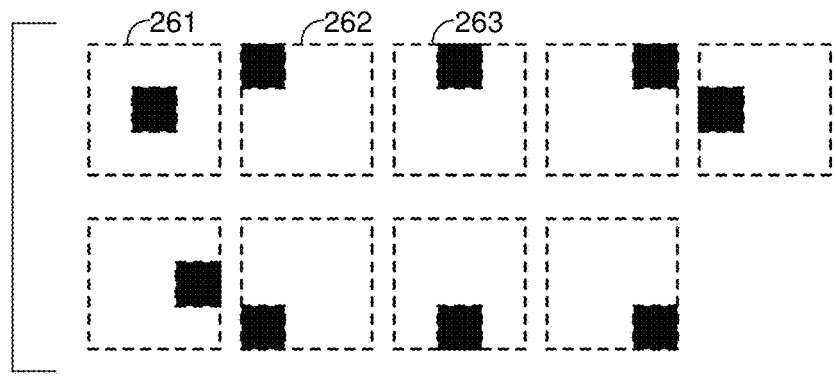
FIGS. 26A, 26B, 26C, 26D, 26E, 26F, 26G, 26H, and 26I show exemplary 3×3 marking blocks.
Figure 26B:
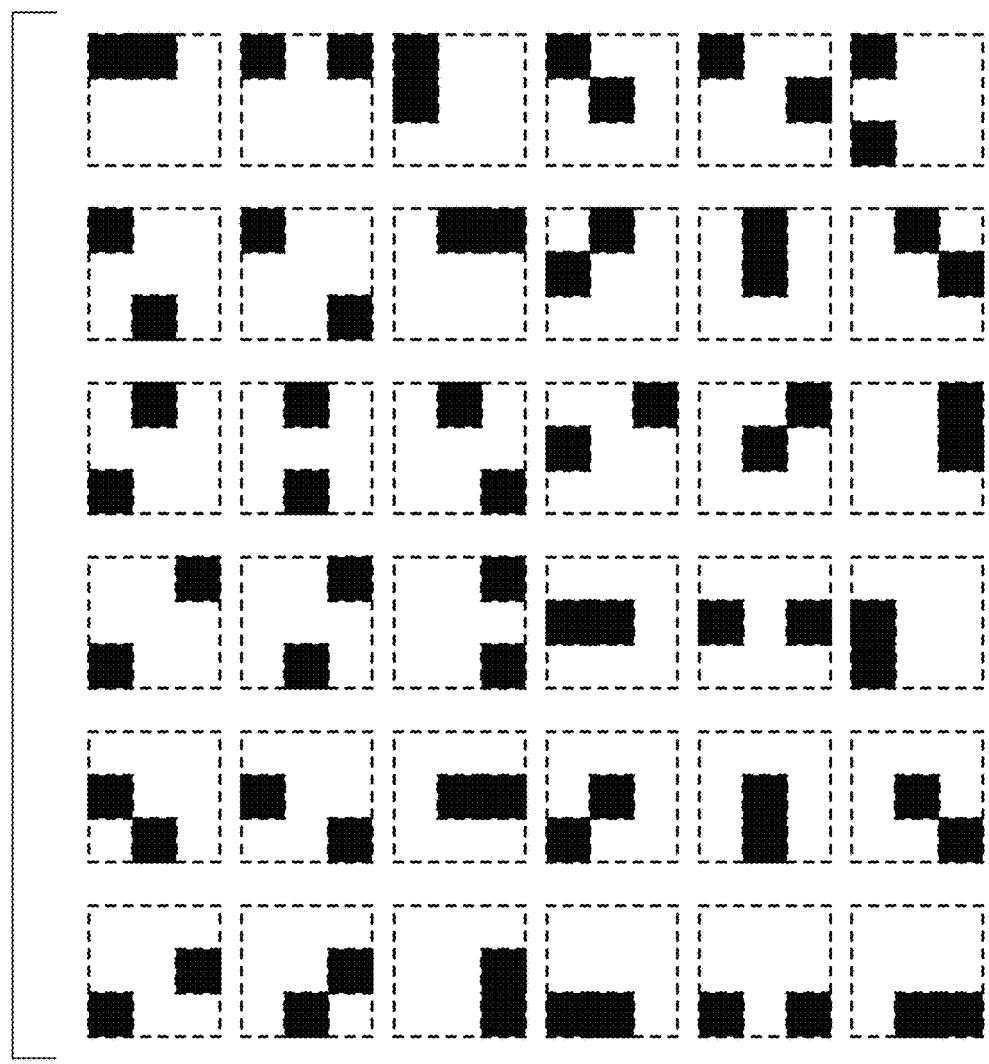

FIGS. 26A-26I show some of the blocks possible with 3×3 arrays of elements. FIG. 26A shows the nine different blocks in which a single element is darkened. FIG. 26B shows the 36 different blocks in which two elements are darkened.

Figure 26C:
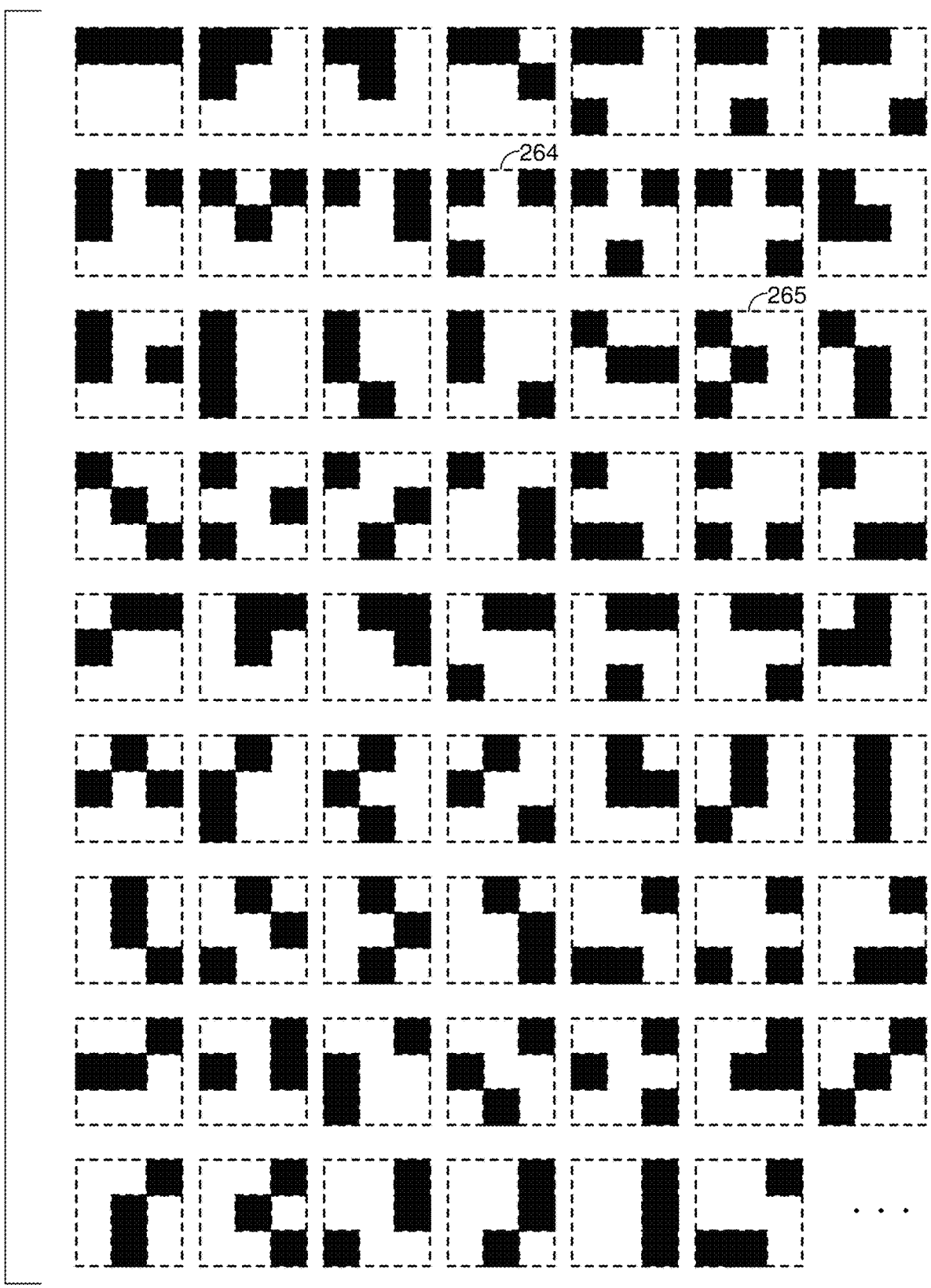
Figure 26D:
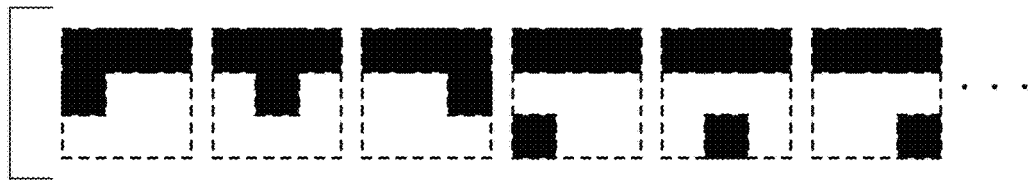
Figure 26E:
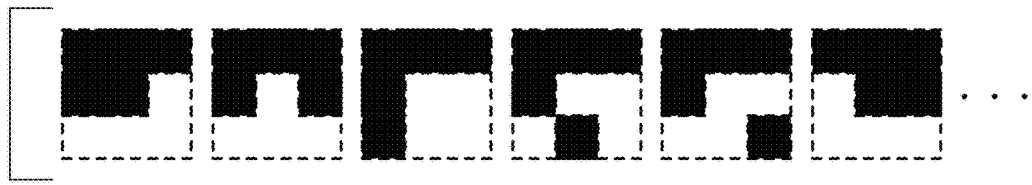
Figure 26F:
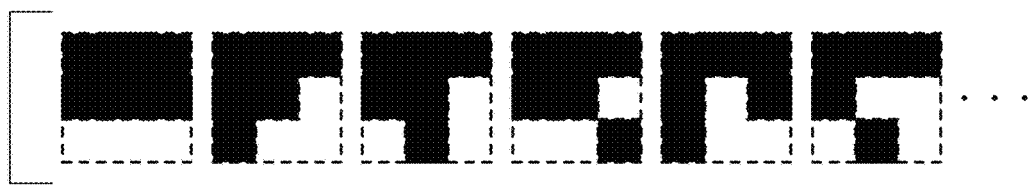
Figure 26G:
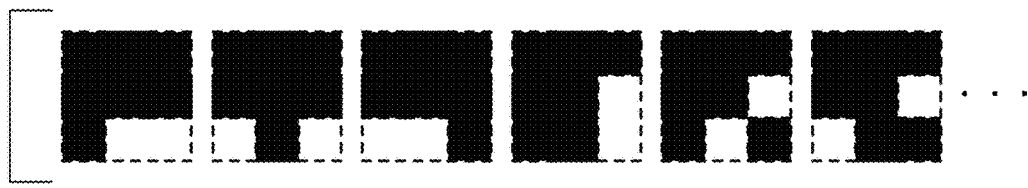
Figure 26H:
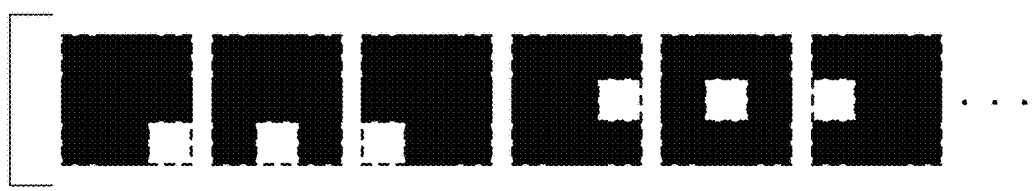
Figure 26I:
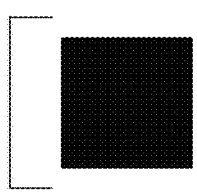

FIG. 26C shows a few of the many different 3×3 blocks in which three elements are darkened. Likewise, FIGS. 26D, 26E, 26F, 26G and 26H show exemplary blocks in which four, five, six, seven and eight elements, respectively are darkened. FIG. 26I shows the single 3×3 block in which all nine elements are darkened.

(It will be recognized that many of the possible blocks are simply rotational variants—or mirror images across horizontal, vertical or diagonal axes—of each other. For example, considering FIG. 26A, it will be recognized that the first three blocks, 261, 262 and 263, are unique, but the following six blocks are just rotational variants of blocks 262 and 263.)

The use of dithered marking blocks enables the printed label to represent some of the variation in values among different elements of the watermark signal. In the particular example illustrated, the data signal is bi-level, but the sync signal is continuous. Representing the sync signal with degrees of gradation—corresponding to variation among values of its components elements—can sometimes improve decodability of the resulting marking.

In the arrangement just-described, the sync signal elements corresponding to dark label markings typically have values ranging from about 100 to about 110. But in other embodiments, much greater variability is present. FIG. 24B shows a table like that of FIG. 24A, but corresponding to a sync signal composed of four sine waves. In such an embodiment, the sync signal elements corresponding to dark markings typically have values ranging from about 28 to 64—more than a 2:1 variation. Different markings can be used at different parts of the composite watermark signal to express some of this variation.

Figure 27:
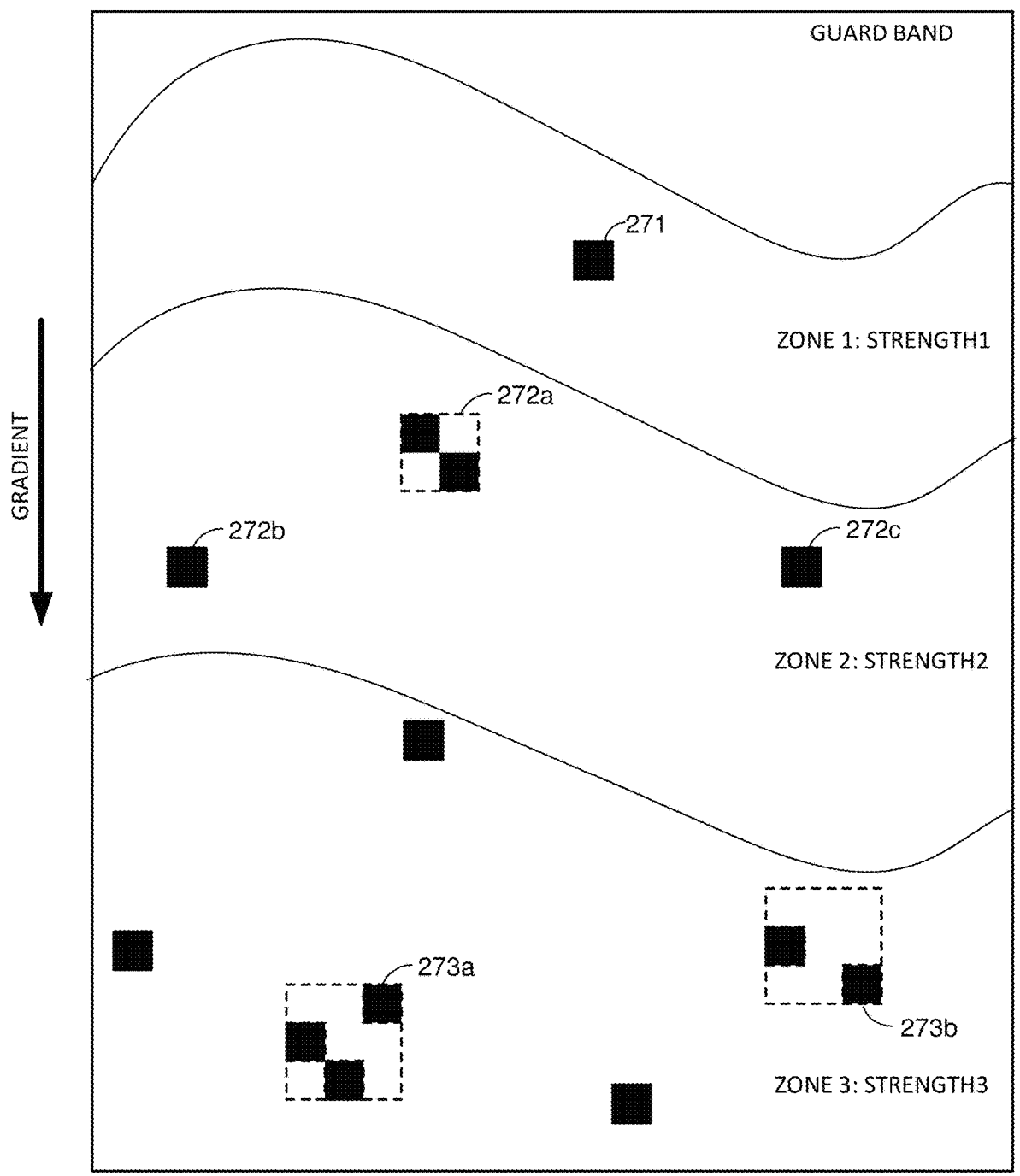
FIG. 27 shows an excerpt of label artwork, including different zones with machine encoding at different strengths.

FIG. 27 shows a label excerpt like that depicted in FIG. 23, but using dithered representations for some of the sparse signal elements.

In Zone 1 of FIG. 27, a single dark mark 271 is depicted. This may be the same element 221 as in FIG. 23. (It may also be a single darkened element within a 2×2 or 3×3 block, such as block 251 in FIG. 25A or block 261 in FIG. 26A.)

Zone 2 includes markings of different types. Some (272b, 272c) are single elements, as were used in Zone 1. There is also a 2×2 block 272a that has two diagonal cells darkened. (This may be termed a 2/4-weighted marking block, indicating 2 cells darkened out of an array of 4 cells.) This latter marking may be used in a spatial location corresponding to the ANDing of the data signal with a particularly low-valued sync signal (e.g., of value 30), whereas the former markings can be used in locations corresponding to higher-valued sync signals (e.g., of values 58 and 62).

Comparing FIGS. 23 and 27, it will be noted that mark 232d in FIG. 23 has no counterpart in FIG. 27. Because block 272a includes two darkened cells, a darkened cell may be omitted elsewhere in Zone 2 to maintain the 1% print density.

Zone 3 in FIG. 27 includes other markings of different types—here including 3×3 blocks 273a and 273b. (Block 273a may be termed a 3/9-weighted marking block, and block 273b may be termed a 2/9-weighted marking block.) Because block 273a includes three darkened elements, and block 273b includes two darkened elements, a total of three darkened elements may be omitted elsewhere in Zone 3 of FIG. 27, as compared with FIG. 23. Again, dithered blocks of different weight are used to represent watermark elements corresponding to sync signal elements of differing values.

Dithered blocks can employed for reasons other than to represent variations in watermark element values. For example, use of dithered elements can make the markings on a label less conspicuous to human viewers.

Backing up, the camera systems used to discern watermark information from printed labels are commonly also designed to read barcodes. As is familiar, a barcode typically includes an array of thin and thick lines. The thin lines may be only a few thousandths of an inch in width. To discern such lines from a typical reading distance, the camera system must have very high resolution.

Such high resolution imagery is not needed for watermark decoding. Indeed, most watermark decoders expect to receive depictions of watermarks at resolutions less than that produced by barcode-capable camera systems. To achieve such reduced resolution, captured imagery is typically down-sampled before watermark decoding. In one illustrative embodiment, a 2:1 down-sampling is applied. Thus, an original image captured at 1600×1200 resolution is converted to 800×600 resolution. This is done by combining 2×2 neighborhoods of pixels in the original image to yield a single pixel in the down-sampled image (e.g., by averaging). Other systems may employ 3:1 down-sampling, e.g., combining 3×3 neighborhoods of pixels in the original image to yield a single pixel in the down-sampled image.

Thus, the dithered 2×2 blocks of FIG. 25A-D may be down-sampled into a single pixel. Likewise with the 3×3 blocks of FIGS. 26A-I.

The signal value that results from down-sampling a 2×2 or 3×3 neighborhood of elements into a single pixel, does not depend much on the particular distribution of darkened elements within the original neighborhood; only the number of darkened elements generally matters. However, the distribution of elements matters to the human eye.

Figure 28A:
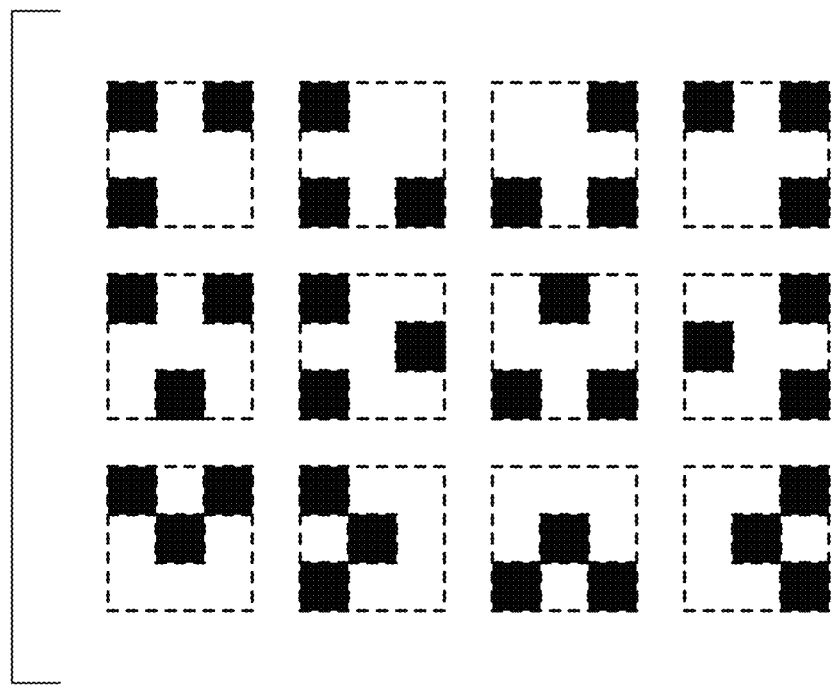
FIG. 28A shows exemplary 3×3 marking blocks in which no darkened cell is edge-adjoining with another darkened cell.
Figure 28B:
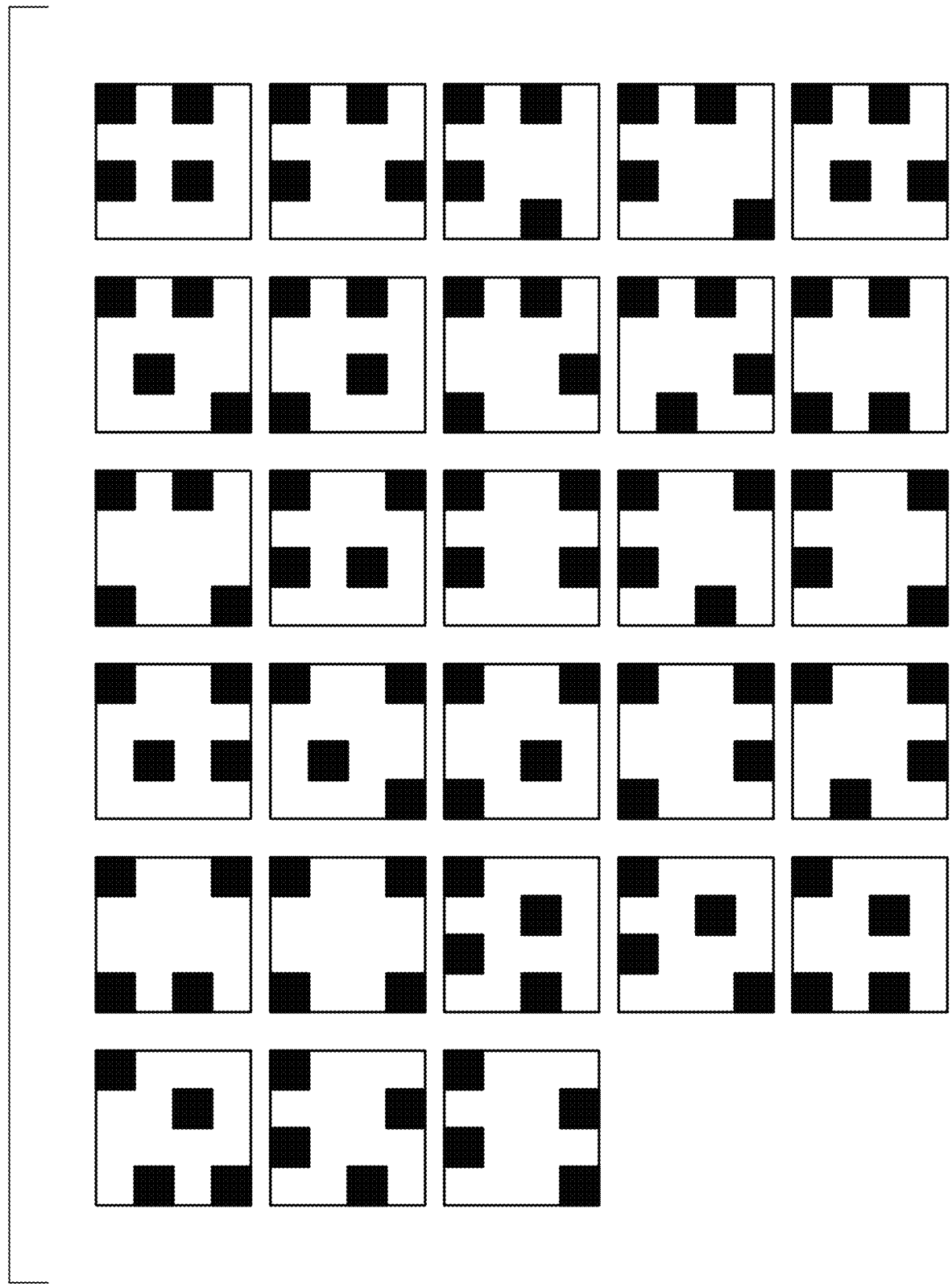
FIG. 28B is like FIG. 28A, but for exemplary 4×4 marking blocks.

FIG. 26C shows 53 different 3×3 blocks in which three cells are darkened (i.e., 3/9-weighted marking blocks). Still more 3/9-weighted marking blocks are not shown. While each effects the same aggregate dithered darkness (i.e., 1/3), applicant has found that blocks in which the darkened cells are not edge-adjoining are less conspicuous to human viewers. Blocks in which darkened cells are separated by white space are best in terms of human aesthetics (e.g., block 264 in FIG. 26C), followed by blocks in which darkened cells adjoin only diagonally (i.e., at their corners, as in block 265 in FIG. 26C). Several such blocks are shown in FIG. 28A and FIG. 28B.

Thus, dithered blocks may be used in label markings simply for better aesthetics—regardless of whether variable information is also thereby represented.

(If two dithered blocks are to be placed next to each other, they are desirably selected so that darkened cells don't adjoin across a block border. For example, the conjunction shown in FIG. 29A between a 3/9-weighted marking block and a 2/9-weighted marking block, is less preferred than the conjunction of the same blocks shown in FIG. 29B, in which the right block has been rotated clockwise 90 degrees.)

Figure 30:
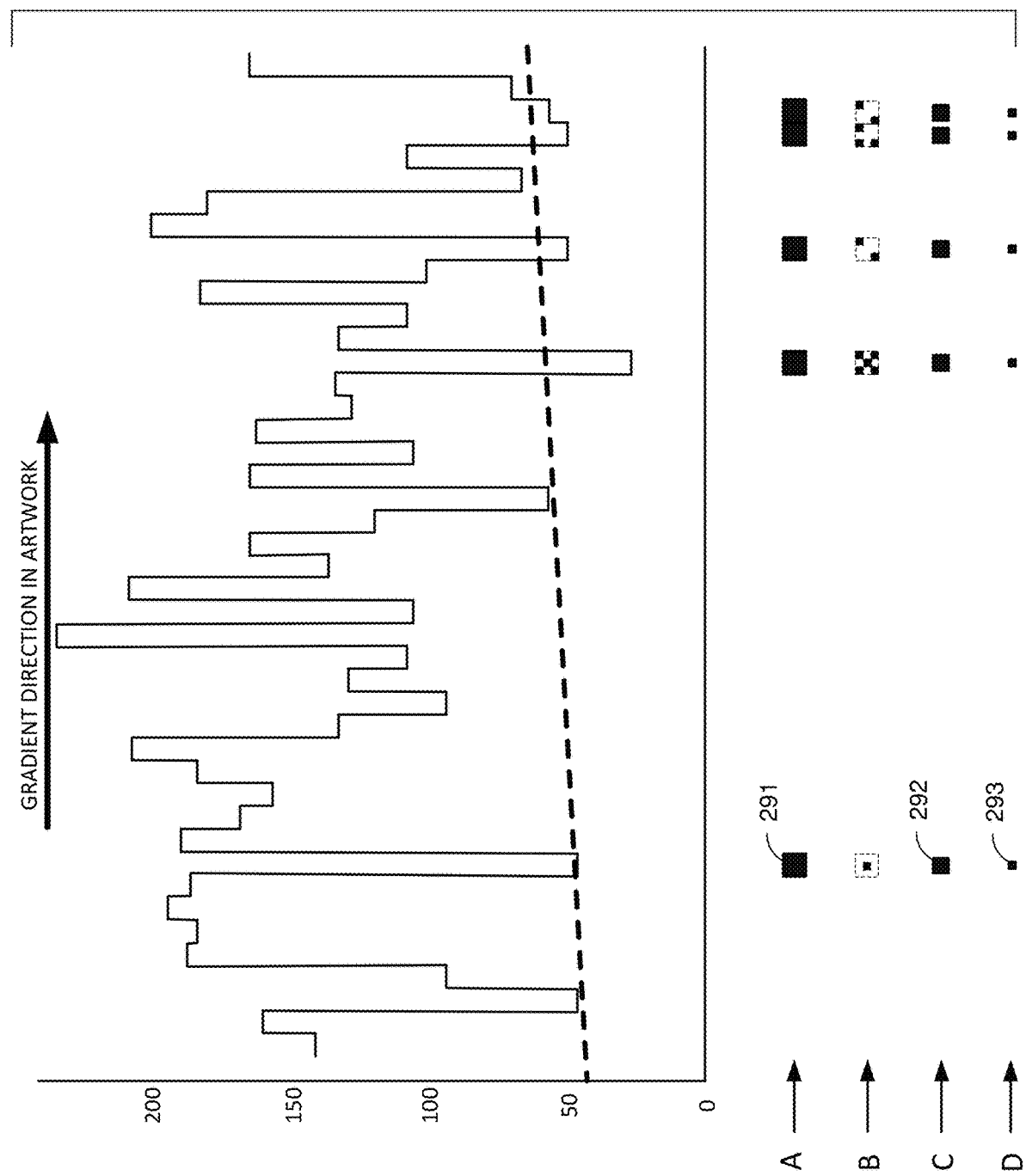
FIG. 30 illustrates how machine encoding markings can be a function of a linear gradient.

In the preceding discussion, different zones of the label were marked with different print densities, e.g., stepping from 1% to 2.5% to 4%. In other embodiments, continuous gradients can be employed. FIG. 30 helps illustrate.

FIG. 30 shows an excerpt from a single row of a sync signal. The sloping dashed line is a linearly-varying gradient. Only those elements of the sync signal whose values fall below the gradient line are candidates for marking (subject to ANDing with the data signal). At other locations, no corresponding mark appears on the label.

If uniform elements 291 are used, the process yields a corresponding row of dark markings, as shown along arrow "A." The amount by which the sync signal is below the threshold does not matter; all of the markings are the same.

If dithered marking blocks are used, a corresponding row of candidate markings results, as shown along arrow "B." Here, the amount by which the sync signal is below the gradient thresholds does matter. If the threshold is barely above the sync signal value, a 1/9-weighted marking block is used. For more substantial excursions, correspondingly denser markings blocks are used (e.g., 2/9-, 3/9-, 4/9- and 5/9-weighted marking blocks). By such arrangement, the same sync signal value may be represented differently at different locations on the label—depending on the corresponding value of the gradient at such locations.

In an alternative arrangement, density of a marking blocks does not depend on difference of a sync signal value from a threshold, but rather depends solely on the sync signal's value. In such arrangement, the same sync signal value will always be represented by the same weight marking on the label (provided a marking is made, based on the ANDing operation).

FIG. 30 also highlights the variable of print resolution. In an exemplary embodiment, a label printer with a 203 dot-per-inch resolution is employed. But, here, the corresponding watermark detector employs 3:1 down-sampling. Accordingly, each element of the sparse mark desirably is made to correspond to a 3×3 dot pattern (yielding a single element after down-sampling). That is, the sparse mark is rendered at about 67 waxels per inch.

Each element of the sparse marking signal can be represented by a dark 3×3 dot block, as shown by block 291. But alternatively, each element can be represented by a dark 2×2 dot block, or a single 1×1 dot block, as shown by blocks 292 and 293, along arrows "C" and "D."

Figure 31:
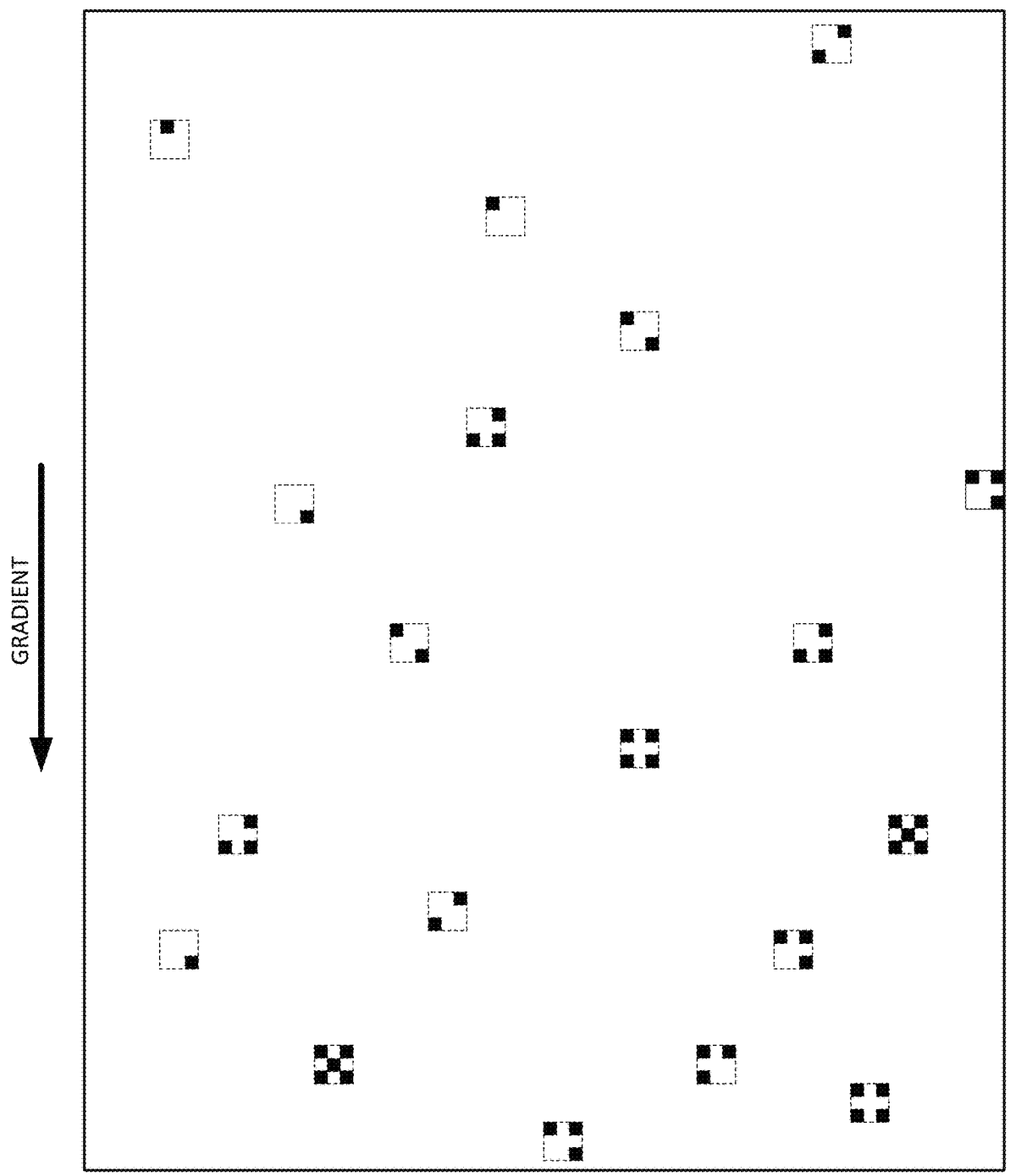
FIG. 31 shows an excerpt of label artwork, with machine encoding varying in strength in accordance with a gradient function.

FIG. 31 shows a white excerpt of label artwork on which a continuous gradient watermark has been formed, employing 3×3 dithered blocks. The spatial density at which the 3×3 blocks appear (i.e., the number of such blocks per unit area) is a function of how many watermark elements fall below the threshold gradient at that part of the artwork. The weight of each dithered block (e.g., 2/9, 3/9, etc.) depends on the amount by which the threshold gradient at that part of the label exceeds the corresponding sync signal element.

Figure 29A:
FIGS. 29A and 29B show different conjunctions of two 3×3 marking blocks.
Figure 29B:

The selection of a particular marking block of a desired weight, from among the (often) plural available options, can be made randomly. The result can be checked for edge-adjoining dark cells (such as depicted in FIG. 29A) and, if found, another marking block can be randomly selected (or the originally-selected marking block can be rotated or flipped to check if the FIG. 29A situation is avoided). Alternatively, a single marking block of each weight may be selected, and used consistently whenever such weighting is required. (Again, a check for the FIG. 29A situation can be made, and different orientations of the single marking block can be tried if found.)

Naturally, while the above examples have concerned linear gradients, it will be recognized that non-linear gradients, e.g., following exponential and other functions, can alternatively be employed. Similarly, it will be recognized that two-dimensional gradients (e.g., that vary in both horizontal and vertical directions) can also be used.

It should be understood that the term "gradient" doesn't always refer to the direction in which density of label marking increases. The term can also be used to refer to the direction in which the density of marking decreases.

While the illustrated dithered marking features are square, this needn't be the case. Non-square features, such as rectangles or other shapes, can alternatively be used.

Speaking of squares, it will be noted that square elements with sharp corners are used in all of the figures to represent dark print markings. In actual practice, sharp-cornered squares are not produced. Instead, the printing process outputs dots of a more rounded configuration. And, as noted earlier, line screening can be applied to further reduce the visibility of the marking.

In a representative label, sparse watermark encoding of a first horizontally-printed swath, an inch wide and tall enough to span 10,000 pixels (e.g., about a quarter inch in an exemplary embodiment), may have darkened between 100 and 200 pixels—or between 1% and 2% of the swath area. Sparse watermark encoding of a second such swath on the same label may have between 225 and 350 pixels darkened. A third such swath may have between 375 and 500 pixels darkened. Different gradient functions—stepped or continuous—can be employed to achieve such differing densities of marking.

The term "watermark" is commonly used to refer to a marking that is imperceptible to human viewers. The markings discussed above are often not of this sort. For example, observers may perceive discrete printed dots, or a greyish cast, on printed labels.

The greyish cast provided by the detailed markings, and the gradient-grey markings that can also be achieved, may be among a palette of patterns from which a graphical artist can draw in composing label artwork. For example, if a blue area of artwork is to transition in luminance between a bright blue and a dark blue of the same chrominance, a gradient grey marking can be added—varying the luminance of the artwork accordingly. (So-called "signal rich art" is further detailed in applicant's published patent application 20110214044.)

Although the preferred arrangement effects thresholding of a continuous synchronization signal, followed by Boolean combination with a binary data signal, other embodiments can proceed differently. For example, some watermark signals are self-syncing, and operate without a synchronization signal component. In this and other such cases, a continuous signal encoding the binary data can be processed as described above to yield sparse markings.

The specification's reference to "continuous" data should be understood to include data represented in plural-bit quantized fashion, e.g., a synchronization signal represented as an array of 8-bit samples.

While the exemplary implementation uses a printer with 203 dots per inch resolution in horizontal and vertical directions, the technology is naturally not so limited. Thermal printers are commonly available with much higher resolutions (e.g., 300×600 dpi), and still higher resolutions are becoming available.

Moreover, the detailed arrangements are suitable for use with printing technologies other than thermal, resulting in markings other than thermally-darkened dots. For example, in alternative embodiments in which ink is deposited on a medium, a colored ink—such as red, blue, cyan or yellow—can be applied to form the detailed markings. In some embodiments, the substrate may be darker, rather than lighter, than the markings, in which case the above-described arrangements can be used in inverse.

Although the discussion particularly focused on a label printed on-demand for adhesive application to an item of deli foodstuffs, the same principles are likewise applicable to labels applied to canned foodstuffs, and printed on boxed retail items.

In one particular such arrangement, sparse markings of the form described above are ink-printed on boxes and on paper labels for cans, by an offset printing press employing multiple printing plates. For example, one plate may lay down a patterned background flood of blue ink on certain areas of the label, three other plates may define cyan, magenta and yellow layers of photographic imagery and other artwork that are printed on another area of the label. And a further plate may define a panel of nutritional information and other black-printed text. This latter plate may include the above-described sparse markings, with guard bands around the text glyphs. Alternatively, the sparse markings may be included in another of the plates, e.g., for cyan, In such latter arrangement, guard bands derived from the text layer can be applied to the cyan plate to define safe areas in which watermark markings are omitted. (Naturally, the particular plural-bit information encoded by the detailed watermark markings is not evident to human observers of such packaging.)

As is familiar, machine-readable coding can serve to instruct a corresponding machine to take certain actions, such as add an item to a checkout tally, and adjust a total by a coupon amount. The actions needn't involve customer checkout; some actions concern product testing and diagnostics. For example, a scanner can be configured to respond to decoding of certain encoded markings (e.g., instructions encoded in the payload of a printed sparse watermark) by initiating various self-check routines and diagnostic tests.

It will be recognized that the detailed arrangements enable machine encoding to be applied over large expanses of a label's area (e.g., commonly more than 50%, and sometimes 75%, 90%, or more), with negligible impact to the readability of label text. (The guard band regions depicted in FIG. 18B leave 63% of the label area available for machine encoding.) Moreover, by spatially varying the strength of the encoding, the attention of human viewers is not drawn to stark borders at which full-strength encoding suddenly begins. Absence of such distraction further aids the viewer in quickly comprehending the printed text.

Because large expanses of a label's area are encoded, the decoding of such information, e.g., at a point of sale system, is made more reliable. Compared to existing barcode markings, the large area encoded with information results in a higher percentage of single-swipe reads. Barcoded items, in contrast, must more frequently be swiped past a scanner system two or more times in order for the small barcode marking to be positioned appropriately for decoding. (The barcode in FIG. 16A spans about 7% of the label area. As noted, the watermark encoding spans over 60% of the label area.)

As point of sale scanners that are capable of decoding watermarked data proliferate (e.g., the Datalogic Magellan 9800i scanner and the Zebra MP6000 scanner), barcodes on labels will become unnecessary—enabling smaller adhesive labels to be used, and reducing material costs—all with improved performance.

CONCLUDING REMARKS

Having described and illustrated the principles of our inventive work with reference to illustrative examples, it will be recognized that the technology is not so limited.

For example, while the first embodiments (e.g., food packaging technology) were described with reference to digital watermark technology, one or more of the components may be otherwise-marked, such as with an RFID chip, a barcode identifier, or any other known marking technology. Again, the marking can convey a GTIN or other identifier that is compared with the identifier read from a complementary component, to assure they correspond in an expected manner.

Similarly, while the second embodiments (e.g., detecting barcode labeling fraud) relied on digital watermarking to identify the retail product, such identification can be performed otherwise, e.g., with object recognition, optical character recognition, RFID chip, etc.

Reference was made to GTIN identifiers. GTIN is a standard, established by GS1. GS1 is a not-for-profit international organization that develops and maintains standards for supply and demand chains. With over a million member companies around the world, GS1—and its standards—are familiar to artisans in the field. The GTIN standard is detailed in a lengthy written specification ("GS1 General Specifications") that is freely available from GS1 on its web site (presently at www<dot>gs1<dot>org/barcodes-eperfid-id-keys/gs1-general-specifications). The current version of this standard (Release 16.0, ratified January, 2016) is incorporated herein by reference.

Various object recognition (sometimes termed image fingerprinting) techniques are known. SIFT, SURF, ORB and CONGAS are some of the most popular algorithms. (SIFT, SURF and ORB are each implemented in the popular OpenCV software library, e.g., version 2.3.1. CONGAS is used by Google Goggles for that product's image recognition service, and is detailed, e.g., in Neven et al, "Image Recognition with an Adiabatic Quantum Computer I. Mapping to Quadratic Unconstrained Binary Optimization," Arxiv preprint arXiv:0804.4457, 2008.) Still other image fingerprinting techniques are detailed in patent publications 20090282025, 20060104598, WO2012004626 and WO2012156774 (all by LTU Technologies of France).

In the detailed embodiments, the watermark payloads conveyed one or more literal identifiers, such as a GTIN identifier. This is not essential. In other embodiments, a watermark can convey an index value, which is used to access a corresponding entry in a data structure (e.g., database) containing further information. Thus, the index value CD398 may correspond to a database record containing the GTIN identifier 0087932602588. Such arrangement requires a database lookup to resolve the watermark payload, but allows greater amounts of information to be represented by the watermark payload.

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Smartphones and other devices according to certain implementations of the present technology can include software modules for performing the different functions and acts.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a point of sale terminal communicates with a central store computer, different tasks can be performed exclusively by one device or the other, or execution can be distributed between the devices. Extraction of watermark information from imagery is one example of a process that can be distributed in such fashion. Thus, it should be understood that description of an operation as being performed by a particular device (e.g., a point of sale terminal) is not limiting but exemplary; performance of the operation by another device (e.g., a remote server), or shared between devices, is also expressly contemplated.

In like fashion, description of data being stored on a particular device is also exemplary; data can be stored anywhere: local device, remote device, in the cloud, distributed, etc.

Reference to "steganographic" means the marking is commonly imperceptible, i.e., it is not noticeable to a viewer examining watermarked packaging from a typical viewing distance (e.g., 20 inches) with retail lighting of conventional intensity.

This specification has discussed several different embodiments. It should be understood that the methods, elements and concepts detailed in connection with one embodiment can be combined with the methods, elements and concepts detailed in connection with other embodiments. While some such arrangements have been particularly described, many have not—due to the large number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The present specification should be read in the context of the cited references. Those references disclose technologies and teachings that the applicant intends be incorporated into embodiments of the present technology, and into which the technologies and teachings detailed herein be incorporated.

To provide a comprehensive disclosure, while complying with the statutory requirement of conciseness, applicant incorporates-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

The claims submitted with this application address just a small fraction of the patentable inventions disclosed herein. Applicant expects many more, and broader, claims will be issued from this patent family.

In view of the wide variety of embodiments to which the principles and features discussed above can be applied, it should be apparent that the detailed embodiments are illustrative only, and should not be taken as limiting the scope of the invention. Rather, applicant claims as the invention all such modifications as may come within the scope and spirit of the following claims and equivalents thereof.

The invention claimed is:

1. A system comprising:
a camera system disposed in a checkout area of a retail store;
a processor, configured by software instructions stored in a memory, to perform actions including:
processing image data, captured by the camera system from product packaging, to decode GTIN data encoded in a steganographic digital watermark on said product packaging;
processing said image data to decode GTIN data encoded in a barcode on said product packaging; and
comparing the GTIN data decoded from the steganographic digital watermark first machine-readable code with the GTIN data decoded from the barcode second machine-readable code to determine whether they correspond.

2. The system of claim 1 in which the software instructions further configure the system to issue an alert signal when there is a mismatch between the GTIN data decoded from the steganographic digital watermark and the GTIN data decoded from the barcode second machine-readable code.

3. The system of claim 2 in which the alert signal includes a signal to store staff alerting said staff to the possible presence of an adhesive barcode label on said packaging.

4. The system of claim 1 in which the steganographic digital watermark on the product packaging comprises an array of sparse elements set at coordinates within a two-dimensional block at which first and second watermark signal components provide compatible modulation, the first watermark signal component encoding the GTIN data, and the second watermark signal facilitating synchronization of a watermark decoder with the first watermark signal component.

5. A non-transitory computer-readable medium containing software instructions for configuring a processor-based computer system to perform acts including:
   processing image data, captured by a camera system from product packaging, to decode GTIN data encoded in a steganographic digital watermark on said product packaging;
   processing said image data to decode GTIN data encoded in a barcode on said product packaging; and
   comparing the GTIN data decoded from the steganographic digital watermark with the GTIN data decoded from the barcode to determine whether they correspond.

6. The computer-readable medium of claim 5 in which said instructions further configure the computer system to issue an alert signal when there is a mismatch between the GTIN data decoded from the steganographic digital watermark and the GTIN data decoded from the barcode.

7. A system comprising:
   a camera system disposed in a checkout area of a retail store to capture imagery of product packaging;
   a digital watermark decoder configured to decode GTIN data encoded in a steganographic digital watermark on said product packaging from said imagery;
   a barcode decoder configured to decode GTIN data encoded in a barcode on said product packaging from said imagery; and
   a processor, configured by software instructions stored in a memory, to compare the GTIN data decoded from the steganographic digital watermark with the GTIN data decoded from the barcode to determine whether they correspond.

8. The system of claim 7 in which said software instructions further configure the processor to issue an alert signal when there is a mismatch between the GTIN data decoded from the steganographic digital watermark and the GTIN data decoded from the barcode.

9. The system of claim 7 in which the digital watermark decoder comprises a means for decoding GTIN data encoded in a steganographic digital watermark on said product packaging from said imagery.

* * * * *